(12) United States Patent
Takagi et al.

(10) Patent No.: US 8,765,087 B2
(45) Date of Patent: Jul. 1, 2014

(54) METHOD FOR REFORMING EXHAUST GAS GENERATED FROM METALLURGICAL FURNACE, METHOD FOR COOLING EXHAUST GAS AND APPARATUS THEREFOR

(75) Inventors: Katsuhiko Takagi, Tokyo (JP); Hitoshi Saima, Tokyo (JP); Yasuhiro Mogi, Tokyo (JP); Yasuo Miyoshi, Tokyo (JP)

(73) Assignee: JFE Steel Corporation (JP)

( * ) Notice: Subject to any disclaimer, the term of this patent is extended or adjusted under 35 U.S.C. 154(b) by 677 days.

(21) Appl. No.: 12/990,375

(22) PCT Filed: May 12, 2009

(86) PCT No.: PCT/JP2009/059111
§ 371 (c)(1),
(2), (4) Date: Oct. 29, 2010

(87) PCT Pub. No.: WO2009/139488
PCT Pub. Date: Nov. 19, 2009

(65) Prior Publication Data
US 2011/0041517 A1 Feb. 24, 2011

(30) Foreign Application Priority Data

| May 16, 2008 | (JP) | 2008-129040 |
| Sep. 5, 2008 | (JP) | 2008-227845 |
| Feb. 27, 2009 | (JP) | 2009-045413 |
| Mar. 5, 2009 | (JP) | 2009-052394 |
| Mar. 31, 2009 | (JP) | 2009-084494 |

(51) Int. Cl.
*B01D 53/62* (2006.01)
*B01D 53/76* (2006.01)
*B01D 53/78* (2006.01)

(52) U.S. Cl.
USPC ............................................. 423/226

(58) Field of Classification Search
USPC .................................................. 423/226
See application file for complete search history.

(56) References Cited

U.S. PATENT DOCUMENTS

| 4,822,411 A | * | 4/1989 | Standler et al. | ................. | 75/496 |
| 5,943,859 A | * | 8/1999 | Kawamura | ...................... | 60/320 |

FOREIGN PATENT DOCUMENTS

| EP | 0 419 868 | | 4/1991 |
| JP | 54-87612 | A | 7/1979 |
| JP | 55-79816 | A | 6/1980 |
| JP | 55-127127 | A | 10/1980 |
| JP | 57-10930 | B | 3/1982 |
| JP | 58-73712 | A | 5/1983 |
| JP | 62-74018 | A | 4/1987 |
| JP | 2-11715 | A | 1/1990 |
| JP | 3-138312 | A | 6/1991 |
| JP | 5-117668 | A | 5/1993 |
| JP | 5-209212 | A | 8/1993 |
| JP | 2000-212615 | A | 8/2000 |
| JP | 2003-166013 | A | 6/2003 |

* cited by examiner

*Primary Examiner* — Stanley Silverman
*Assistant Examiner* — Daniel Berns
(74) *Attorney, Agent, or Firm* — DLA Piper LLP (US)

(57) ABSTRACT

A reforming method of a metallurgical furnace generated exhaust gas includes reforming a high temperature exhaust gas discharged from a metallurgical furnace by adding a reducing agent to the gas, wherein addition of the reducing agent is initiated when an oxygen concentration in the exhaust gas is 1 vol % or less, and a reforming reaction is completed when a temperature of the exhaust gas is 800° C. or higher, and an apparatus thereof. The reducing agent is blown from a reducing agent blowing nozzle having a double pipe structure.

15 Claims, 10 Drawing Sheets

METHOD FOR REFORMING EXHAUST GAS GENERATED FROM METALLURGICAL FURNACE, METHOD FOR COOLING EXHAUST GAS AND APPARATUS THEREFOR

RELATED APPLICATIONS

This is a §371 of International Application No. PCT/JP2009/059111, with an international filing date of May 12, 2009 (WO 2009/139488 A1, published Nov. 19, 2009), which is based on Japanese Patent Application Nos. 2008-129040, filed May 16, 2008, 2008-227845, filed Sep. 5, 2008, 2009-045413, filed Feb. 27, 2009, 2009-052394, filed Mar. 5, 2009, and 2009-084494, filed Mar. 31, 2009, the subject matter of which is incorporated by reference.

TECHNICAL FIELD

This disclosure relates to a reforming method and a cooling method of an exhaust gas generated from a metallurgical furnace, and their apparatuses. In particular, the disclosure relates to a reforming method and a cooling method of an exhaust gas containing carbon dioxide gas generated from a metallurgical furnace such as an oxygen converter or a smelting reduction furnace, and their apparatuses.

BACKGROUND

In recent years, emission reduction of carbon dioxide gas is becoming an important issue to protect global environment and prevent global warming. In particular, in steelworks, emission reduction of carbon dioxide gas is the most important issue concerning the survival of a company. For emission reduction, various proposals have conventionally been made. However, a full-scale carbon dioxide gas reduction technology is not yet completed.

In general, high temperature exhaust gases containing a large amount of carbon dioxide gas are generated from an oxygen converter, a smelting reduction furnace and the like in steelworks. Those exhaust gases contain carbon monoxide and hydrogen in addition to carbon dioxide gas, and are therefore utilized as an energy source operating various facilities in the steelworks. Furthermore, from the standpoint of utilization of sensible heat of such high temperature exhaust gas, the high temperature exhaust gas is generally supplied to a boiler to generate low pressure steam, thereby recovering waste heat. However, low pressure steam as an energy source in steelworks is not valuable, and it is rather desired to make high temperature exhaust gas chemically utilizable.

In the meantime, it is known that various hydrocarbons such as methane, and oxygen-containing compounds such as methanol and dimethyl ether react with carbon dioxide gas or water vapor and are reformed into carbon monoxide and hydrogen. As a waste heat recovering technique utilizing this reaction, Japanese Patent Unexamined Publication JP-A 2000-212615 discloses a method for attempting "calorie-upgrading," in which a gas and/or a liquid containing hydrocarbons are supplied to a high temperature waste gas containing carbon dioxide and/or water vapor, generated from refining facilities such as an oxygen converter to cause a reforming reaction, and concentration of both carbon monoxide and hydrogen in the exhaust gas are increased, thereby increasing latent heat of the exhaust gas.

In the method disclosed in JP-A 2000-212615, when natural gas is blown into an oxygen converter exhaust gas to conduct a reforming reaction of the following formula (1), a temperature at a position at which the reaction is considered to have been completed is decreased to about 375° C. However, according to our studies, it was revealed that when the reforming reaction completion temperature is lower than 800° C., there is the problem that formation of carbon is remarkable, causing deposition of carbon and dust in an oxygen converter gas recovery system. In addition to this, decrease in the reforming reaction completion temperature incurs decrease in reforming reaction efficiency, resulting in decrease in conversion of carbon dioxide.

$$CH_4 + CO_2 \rightarrow 2CO + 2H_2 \quad (1)$$

JP-A 5-117668 (1993) discloses a method for attempting to increase heat of an exhaust gas, in which coal is supplied to a position at which a temperature of a gas discharged from an oxygen converter is 600° C. or higher, and the exhaust gas and the coal are brought into countercurrent contact to conduct a reforming reaction of the following formula (2), thereby generating carbon monoxide:

$$CO_2 + C \rightarrow 2CO \quad (2).$$

The method disclosed in JP-A 5-117668 (1993) is excellent in that a reforming reaction is conducted using inexpensive coal, but has the problem that non-combustible materials ($SiO_2$, $Al_2O_3$ and the like) contained in the coal deposit in a duct, or drop in an oxygen converter, causing the increase in an amount of slag.

JP-A 2-11715 (1990) discloses a method for increasing amounts of carbon monoxide and hydrogen in an exhaust gas, in which methane and water vapor are added to a position at which a temperature of an exhaust gas generated from an oxygen converter is 1,300° C. or higher, thereby conducting steam reforming reaction of the following formula (3), and an apparatus thereof:

$$CH_4 + H_2O \rightarrow CO + 3H_2 \quad (3).$$

The method disclosed in JP-A 2-11715 (1990) has the problem that the reaction occurred by the addition of water vapor generates only CO and $H_2$, a reforming reaction involving carbon dioxide does not occur and, therefore, the method does not contribute to reduction of $CO_2$.

As described above, the conventional technologies for attempting calorie-upgrading, in which latent heat value of an exhaust gas is increased (endothermic reaction heat of the formula (1) is stored in a form of combustion heat of a reaction product) by utilizing sensible heat of a carbon dioxide gas-containing exhaust gas generated from metallurgical furnaces such as an oxygen converter and a smelting reduction furnace had the problems that deposition of carbon and decrease in reaction efficiency of carbon dioxide gas are incurred, deposition of non-combustible materials such as $SiO_2$, $Al_2O_3$ and the like is incurred, and because carbon dioxide gas does not contribute to a reaction, there is no effect in calorie-upgrading of an exhaust gas and emission reduction of carbon dioxide gas.

Conventionally, the representative method for cooling high temperature exhaust gas generated from metallurgical furnaces such as an oxygen converter and a smelting reduction furnace is a mechanical method in which an exhaust gas is cooled using a water-cooling jacket (water-cooling pipe) placed in a duct (duct) of an oxygen converter gas recovery system, and exhaust heat is recovered using a heat exchanger (see Japanese Patent Examined Publication JP-B 57-10930 and Japanese Patent Un-examined Publication JP-A 62-074018 (1987)).

However, in the case of the above-described conventional arts, a duct, for example, a radiation part (duct) in the case of an oxygen converter gas recovery system, must have a water-cooling jacket structure. Due to this, there were the problems that a cooling equipment having a complicated and large-scale structure must be constructed, and an exhaust heat boiler must further be installed. Furthermore, a target exhaust gas (gas to be cooled) is a metallurgical furnace-generation exhaust gas having high temperature of 800° C. or higher, and when the exhaust gas is attempted to cool with the above cooling equipment, it is indispensable to use materials withstanding the high temperature.

A cooling method with a water spray method is considered as other cooling method. However, a large-scale cooling apparatus for the spray and the contact between water and a gas must be installed. Furthermore, a gas after cooling contains water vapor, and this is disadvantage in the case that a gas after treatment is tried to utilize as a combustible gas.

It could therefore be helpful to provide a reforming method of high temperature exhaust gas that can achieve emission reduction of carbon dioxide gas together with calorie-upgrading of an exhaust gas by inducing an efficient carbon dioxide reforming reaction without deposition of carbon and non-combustible materials, and an apparatus for the method.

It could also be helpful to provide a convenient method for cooling high temperature exhaust gas of 800° C. or more by utilizing a chemical reaction, wherein sensible heat of a metallurgical exhaust gas is utilized without constructing large cooling equipment, and a cooling apparatus for the method.

SUMMARY

We provide a method for reforming an exhaust gas generated from a metallurgical furnace including adding a reducing agent to an exhaust gas containing high temperature carbon dioxide gas discharged from a metallurgical furnace and reacting the carbon dioxide gas and the reducing agent and to reform the exhaust gas, wherein the reducing agent is added when an oxygen concentration in the exhaust gas is 1 vol% or less, and the reforming reaction is completed when an exhaust gas temperature is 800° C. or more.

We also provide a method for producing a reformed gas including adding a reducing agent to an exhaust gas containing high temperature carbon dioxide gas discharged from a metallurgical furnace to react the carbon dioxide gas and the reducing agent, wherein the reducing agent is added when an oxygen concentration in the exhaust gas is 1 vol% or less, and the reforming reaction is completed when an exhaust gas temperature is 800° C. or more.

We further provide an apparatus for reforming an exhaust gas generated from a metallurgical furnace in which a reducing agent is added to the exhaust gas containing high temperature carbon dioxide gas, discharged from a metallurgical furnace, and the carbon dioxide gas and the reducing agent are reacted, thereby reforming the exhaust gas, the apparatus including a concentration measurement device that measures an oxygen concentration in the exhaust gas in an oxygen converter gas recovery system, a flow passage changeover device that performs flow passage changeover of exhaust gas pipe lines by output of the concentration measurement device, a temperature measurement device that measures a temperature of the exhaust gas calorie-upgraded by a reforming reaction, a flow rate control device that controls an addition amount of the reducing agent, operated by output from the temperature measurement device and output of the concentration measurement device, and a reducing agent blowing device.

We still further provide an apparatus for reforming an exhaust gas generated from a metallurgical furnace, used for reforming the exhaust gas by a reforming reaction between carbon dioxide gas contained in the exhaust gas and a reducing agent by adding the reducing agent to high temperature exhaust gas discharged from the metallurgical furnace, wherein a reducing agent blowing nozzle having a concentric double pipe structure including an outer pipe for blowing diluted nitrogen and an inner pipe for flowing a reducing agent, fitted together by insertion in the outer pipe is installed to a duct wall of the oxygen converter gas recovery system of the metallurgical furnace.

We further yet provide a method for cooling an exhaust gas generated from a metallurgical furnace including adding a reducing agent to an exhaust gas containing high temperature carbon monoxide and carbon dioxide discharged from a metallurgical furnace to induce an endothermic reaction between the reducing agent and the carbon dioxide gas in the exhaust gas, and cooling the exhaust gas by the endothermic reaction.

We also further provide a cooling apparatus of an exhaust gas generated from a metallurgical furnace, including a reducing agent blowing nozzle that induces an endothermic reaction with carbon dioxide gas in high temperature exhaust gas containing carbon dioxide gas and carbon monoxide, installed to one to plural places of the duct part in the oxygen converter gas recovery system.

DETAILED DESCRIPTION

Figure 1:
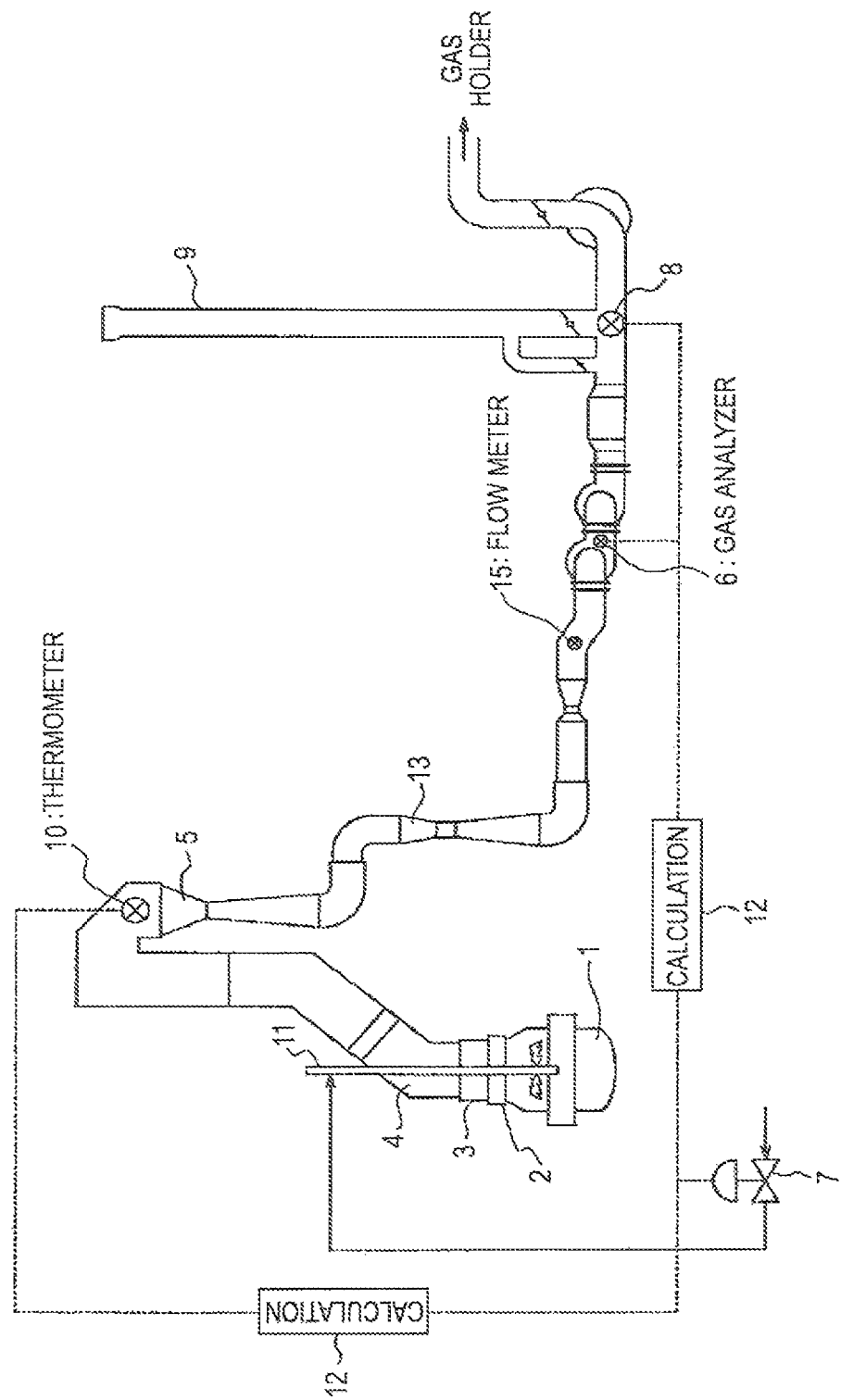
FIG. 1 is a schematic view of a reforming apparatus of a converter exhaust gas according to Example A.

We provide a reforming method of an exhaust gas discharged from a metallurgical furnace, comprising adding a reducing agent to an exhaust gas containing high temperature carbon dioxide gas, discharged from a metallurgical furnace, reacting the carbon dioxide gas and the reducing agent, and reforming the exhaust gas, wherein the reducing agent is added when an oxygen concentration in the exhaust gas is 1 vol % or less, and the reforming reaction is completed when an exhaust gas temperature is 800° C. or more.

The reducing agent is selected from fossil resource type compounds and nonfossil resource type compounds. In the case of the fossil resource type compounds, the reducing agent is preferably at least one selected from the group consisting of natural gas, liquefied petroleum gas, methane, ethane, light naphtha, raffinate, methanol, ethanol, dimethyl ether and diethyl ether. In the case of the nonfossil resource type compounds, the reducing agent is preferably at least one selected from the group consisting of bioethanol, biodiesel and a mixture of bioethanol and biodiesel.

The high temperature exhaust gas discharged from the metallurgical furnace has a temperature of preferably from 800 to 1,800° C., and more preferably from 1,000 to 1,800° C.

The high temperature exhaust gas discharged from the metallurgical furnace has a $CO_2$ concentration of preferably from 3 to 30 vol %.

The reducing agent is preferably added when an oxygen concentration in the exhaust gas is 0.5 vol % or less.

The reforming reaction is completed when the exhaust gas temperature is preferably from 800 to 1,100° C., and more preferably from 850 to 1,050° C.

The reforming reaction is preferably conducted at the exhaust gas temperature of 800° C. or more for a residence time of from 0.01 to 50 seconds, and more preferably conducted at the exhaust gas temperature of 800° C. or higher for a residence time of from 0.1 to 20 seconds.

In the case that the metallurgical furnace is an oxygen converter and a residence time is prolonged, the reducing agent is desirably added from a side pipe of a top blowing lance of the oxygen converter. In the case that the metallurgical furnace is an oxygen converter and a residence time is shortened, the reducing agent is preferably added between a skirt device and a primary dust collector in an oxygen converter gas recovery system.

We further provide a production method of a reformed gas, comprising adding a reducing agent to an exhaust gas containing high temperature carbon dioxide gas, discharged from a metallurgical furnace, and reacting the carbon dioxide gas and the reducing agent, wherein the reducing agent is added when an oxygen concentration in the exhaust gas is 1 vol % or less, and the reforming reaction is completed when an exhaust gas temperature is 800° C. or more.

The reducing agent is preferably at least one fossil resource type compound selected from the group consisting of natural gas, liquefied petroleum gas, methane, ethane, light naphtha, raffinate, methanol, ethanol, dimethyl ether and diethyl ether.

The reducing agent is preferably at least one nonfossil resource type compound selected from the group consisting of bioethanol, biodiesel and a mixture of bioethanol and biodiesel.

We still further provide a reforming apparatus of an exhaust gas in an oxygen converter gas recovery system in which a reducing agent is added to an exhaust gas containing high temperature carbon dioxide gas, discharged from a metallurgical furnace, and the carbon dioxide gas and the reducing agent are reacted, thereby reforming the exhaust gas, the apparatus comprising a concentration measurement device measuring an oxygen concentration in the exhaust gas, in the gas recovery system; a flow passage changeover device performing flow passage changeover of exhaust gas pipe lines by output of the concentration measurement device; a temperature measurement device measuring a temperature of the exhaust gas calorie-upgrading by a reforming reaction; a flow rate control device controlling an addition amount of the reducing agent, operated by output from the temperature measurement device and output of the concentration measurement device; and a reducing agent blowing device.

The concentration measurement device is preferably as follows:

(A) A gas analyzer installed to the upstream side of a primary dust collector in the oxygen converter gas recovery system.
(B) A gas analyzer installed to the downstream side of a secondary dust collector in the oxygen converter gas recovery system.
(C) Both the analyzer (A) and the analyzer (B).

The flow passage changeover device is preferably a gas flow passage changeover valve operating according to the output of an oxygen concentration by the concentration measurement device and selecting a flow passage to a flare or a gas holder.

The temperature measurement device is preferably a thermometer installed to an entry side of the primary dust collector in the oxygen converter gas recovery system.

The flow rate control device of the reducing agent preferably operates according to at least one output of the concentration measurement device and the temperature measurement device.

The reducing agent blowing device is desirably installed to at least one place between a top blowing lance of a oxygen converter, or a skirt device in the oxygen converter gas recovery system, and the upstream side of the primary dust collector in a radiation part of the gas recovery system.

We yet further provide a reforming apparatus of an exhaust gas discharged from a metallurgical furnace, used for reforming the exhaust gas by a reforming reaction between carbon dioxide gas contained in the exhaust gas and a reducing agent by adding the reducing agent to high temperature exhaust gas discharged from the metallurgical furnace, wherein a reducing agent blowing nozzle having a concentric double pipe structure comprising an outer pipe for blowing diluted nitrogen and an inner pipe for blowing a reducing agent, fitted together by insertion in the outer pipe is installed to an exhaust gas duct of the gas recovery system of metallurgical furnace.

The metallurgical furnace is preferably an oxygen converter.

The exhaust gas duct desirably comprises a lower hood, an upper hood and a radiation part in the gas recovery system.

At least one reducing agent blowing nozzle is preferably installed in a circumferential direction at a lower part of the radiation part of the exhaust gas duct.

The reducing agent blowing nozzle is preferably that the reducing agent is jetted from a central passage formed by the inner pipe, and the diluted nitrogen is jetted from a circular passage formed between the inner pipe and the outer pipe.

The outer pipe may be a diluted nitrogen blowing pipe for emergency stop by diluting an exhaust gas generated from a metallurgical furnace, fitted to the exhaust gas duct. The diluted nitrogen jetted from the circular passage of the outer pipe may be diluted nitrogen for emergency stop by diluting an exhaust gas generated from a metallurgical furnace.

The reducing agent preferably contains at least one fossil resource type compound selected from the group consisting of natural gas, liquefied petroleum gas, methane, ethane, light naphtha, raffinate, methanol, ethanol, dimethyl ether and diethyl ether.

The reducing agent preferably contains at least one non-fossil resource type compound selected from the group consisting of bioethanol, biodiesel and a mixture of bioethanol and biodiesel.

We also provide a cooling method of an exhaust gas generated from a metallurgical furnace, comprising adding a reducing agent to the exhaust gas generated from a metallurgical furnace of high temperature containing carbon monoxide and carbon dioxide gas to induce an endothermic reaction between the reducing agent and the carbon dioxide gas in the exhaust gas, and cooling the exhaust gas itself by the endothermic reaction.

It is preferred that blowing of the reducing agent is conducted in a duct until an entry side of a dust collector, the endothermic reaction causes in the duct, and the reaction is completed when a gas temperature after the reaction is 800° C. or higher. The duct is desirably a radiation part between an upper hood of an oxygen converter and an entry side of a primary dust collector.

The exhaust gas is desirably an oxygen converter exhaust gas containing converter dust, discharged from the oxygen converter. The endothermic reaction is catalyzed by an iron oxide fine powder in the converter dust.

The reducing agent is preferably at least one selected from the group consisting of natural gas, liquefied petroleum gas, methane, ethane, light naphtha, raffinate, methanol, ethanol, dimethyl ether and diethyl ether.

We further provide a cooling apparatus of an exhaust gas generated from a metallurgical furnace, comprising a reducing agent blowing nozzle for inducing an endothermic reaction with carbon dioxide gas in high temperature exhaust gas containing carbon dioxide gas and carbon monoxide, installed to one to plural places of a duct part in the oxygen converter gas recovery system.

The duct part is preferably between a top blowing lance of an oxygen converter, or a lower hood in an oxygen converter gas recovery system, and an entry side of a primary dust collector.

The exhaust gas is desirably an oxygen converter exhaust gas containing converter dust, discharged from the oxygen converter. The endothermic reaction is catalyzed by an iron oxide fine powder in the converter dust.

The reaction between the carbon dioxide gas in the exhaust gas and the reducing agent is preferably an endothermic reaction catalyzed by an iron oxide fine powder in the converter dust.

The reducing agent is preferably at least one selected from the group consisting of natural gas, liquefied petroleum gas, methane, ethane, light naphtha, raffinate, methanol, ethanol, dimethyl ether and diethyl ether.

EXAMPLE A

Example A is a reforming method of high temperature exhaust gas, for achieving efficient calorie-upgrading of an exhaust gas and emission reduction of carbon dioxide gas by complete progress of a carbon dioxide gas reforming reaction, without deposition of carbon, non-combustible materials and the like in a duct. Specifically, a reducing agent is added to high temperature exhaust gas of 800° C. or higher, and preferably 1,000° C. or higher, discharged from a metallurgical furnace. The metallurgical furnace is hereinafter described in the example of an "oxygen converter." The high temperature exhaust gas is hereinafter referred to as an "offgas." Addition of a reducing agent induces a reforming reaction between carbon dioxide gas contained in the offgas and the reducing agent such as natural gas, as shown by the formula (1):

$$CH_4 + CO_2 \rightarrow 2CO + 2H_2 \qquad (1).$$

Heat of the offgas is increased by controlling any one of addition amount, addition period and addition position of the reducing agent such that the period of initiating addition of a reducing agent is when an oxygen concentration in the offgas has became 1 vol % or less and the reforming reaction is completed when an offgas temperature is 800° C. or higher.

The offgas discharged from a oxygen converter generally contains from about 10 to 20 vol % of $CO_2$ and from about 50 to 80 vol % of CO, a calorific value is from about 1,500 to 2,000 kcal/Nm³, and a temperature at a throat part during operation is from about 1,200 to 1,800° C. In Example A, calorie-upgrading of the offgas and emission reduction of carbon dioxide gas are simultaneously achieved by adding a reducing agent such as natural gas to offgas of the oxygen converter and deriving the reforming reaction of the formula (1) between the reducing agent and carbon dioxide gas. That is to say, because calorie-upgraded offgas, that is, reformed offgas, is used as various heat sources in steelworks (for combustion), carbon dioxide gas is finally emitted. However, an auxiliary fuel such as heavy oil used in steelworks can be reduced in an amount corresponding to the calorie-upgrading portion, and as a result, carbon dioxide gas can be reduced in the corresponding amount.

FIG. 1 is a schematic diagrammatic view of an oxygen converter gas recovery system of a oxygen converter for explaining the exhaust gas reforming method according to Example A. As shown in the drawing, offgas generated from a oxygen converter 1 is discharged through a skirt 2, a lower hood 3, an upper hood 4, a primary dust collector (wet dust collector) 5, a secondary dust collector 13, and the like, during of which an oxygen concentration is measured with a gas analyzer 6 provided at an outlet side (downstream side) of the secondary dust collector 13 continuously, semicontinuously or intermittently. When an oxygen concentration in the offgas is larger than 1 vol %, a control valve 7 controlling an addition (injection) amount of a reducing agent for a reforming reaction is shut, and at the same time, a gas flow channel changeover valve 8 is shut, so that the offgas flows to a flare 9 side.

FIG. 1 shows an Example A that the gas analyzer 6 is provided at a downstream side of the secondary dust collector 13. However, the gas analyzer 6 can be provided at an upstream side of the primary dust collector 5 which is a position adjacent to a thermometer 10, or can be provided at both an upstream side of the primary dust collector 5 and a downstream side of the secondary dust collector 13.

The form of the gas analyzer 6 is not particularly limited, but an analyzer that can measure a carbon dioxide gas concentration (flow rate) and an offgas flow rate in addition to an oxygen concentration is preferred. Flow rate of carbon dioxide gas can be obtained from the measured value of the gas analyzer 6, and consequently an injected amount of a reducing agent for a reforming reaction can be determined.

For example, when an oxygen concentration is decreased to 1 vol % or less and an offgas temperature measured by the thermometer 10 provided at an upstream side of the primary dust collector is 800° C. or higher, the gas flow channel changeover valve 8 is opened, so that the offgas flows to a gas holder (not shown) side, and at the same time, a flow rate control valve 7 is opened, and for example, a reducing agent for a reforming reaction is added from a side pipe of an oxygen top blowing lance 11. It may be necessary that an offgas temperature is continuously measured by the thermometer 10 and an injected amount of a reducing agent and/or an addition (injection) position thereof is controlled such that the reforming reaction is completed at a calorie-upgraded offgas temperature of 800° C. or higher.

The reducing agent is added when an oxygen concentration in the offgas is 1 vol % or less. The reason for this is as follows. When oxygen in the offgas is larger than 1 vol %, hydrogen gas in the offgas and hydrogen atom in the reducing agent are prone to react with oxygen to generate water vapor, and a reforming reaction due to the addition of a reducing agent by the water vapor proceeds. As a result, conversion of carbon dioxide gas is decreased, resulting in decrease in carbon dioxide gas reduction effect. When a reducing agent is added at the time that an oxygen concentration in the offgas is larger than 1 vol %, there is the danger of ignition and explosion.

An oxygen concentration in the offgas preferably approaches zero as possible to efficiently conduct the carbon dioxide gas reforming reaction represented by the formula (1). However, incorporation up to about 1 vol % is an allowable range. The reason for this is as follows. An oxygen converter gas recovery system of a oxygen converter is prepared such that air is slightly incorporated therein. Therefore, long time is required to decrease an oxygen concentration to a detection limit or less. If a reducing agent cannot be added during the period, not only a calorie-upgrading effect is decreased, but an amount burned by the flare 9 is merely increased, unfavorably resulting in increase in carbon dioxide gas emission. Therefore, it is the necessary condition in Example A that an oxygen concentration in the offgas when the reducing agent is initiated to inject is 1 vol % or less.

It is important in Example A that the addition amount of a reducing agent and/or the addition position thereof are adjusted such that the reforming reaction is completed when a temperature of a low temperature reforming exhaust gas, that is, offgas in a calorie-upgraded state in a form of fuel latent heat of a reaction product, is 800° C. or higher by the above reforming reaction utilizing the sensible heat of the exhaust gas. Thus, the offgas temperature at the time of completion of the reforming reaction is required to be 800° C. or higher, and the temperature is more preferably 850° C. or higher. The reason for this is as follows. When the offgas temperature at the time of completion of the reforming reaction is lower than 800° C., not only carbon such as fly ash is generated to deposit in a duct, but conversion of carbon dioxide gas is decreased, resulting in decrease in both calorie-upgrading effect and carbon dioxide gas reduction effect.

In other words, the concept of Example A is not that a reforming reaction is controlled by a flow rate of carbon dioxide gas in offgas, but is in point that calorie-upgrading of offgas is controlled targeting the offgas temperature (800° C.) at the time of completion of the reforming reaction. The reason for this is as follows. A oxygen converter is generally a batchwise furnace, and has the property that an offgas temperature greatly fluctuates when abnormal blowing such as increase in iron oxide in molten steel occurs. In other words, the method is advantageous to avoid inductance by fluctuation of an offgas temperature.

For the reason above, the addition amount and the addition position of a reducing agent are determined such that the reforming reaction is completed when the temperature of offgas calorie-upgraded (accumulated as thermal energy) is 800° C. or higher. For example, in the case that a reducing agent is noted, the addition amount is preferably changed depending on a carbon dioxide gas flow rate, a kind of a reducing agent, stoichiometry of a carbon dioxide gas reforming reaction, an offgas temperature at the addition position, and a gas residence time of from the addition position to a position of the thermometer 10.

The term "completion of the reforming reaction" described above means that a reaction between a reducing agent added, such as methane, and carbon dioxide gas in an exhaust gas proceeded to almost-equilibrium in its atmosphere. To make the reaction proceed until complete equilibrium, theoretically an infinite residence time is necessary. Therefore, the almost-equilibrium cannot strictly be defined. For this reason, it is preferred in Example A that when a hydrogen gas concentration described hereinafter is increased to a hydrogen gas concentration in an exhaust gas before reforming is defined as "completion of the reforming reaction."

For example, in decarbonization blowing, a hydrogen gas amount in an exhaust gas is originally small as about 1 vol %, and due to this, a hydrogen gas concentration in an exhaust gas after reforming is increased to about from 2 to 25 times the hydrogen gas concentration before reforming. Therefore, monitoring is easy. For this reason, it is preferred in decarbonization blowing that when hydrogen gas is increased to two times or more as compared with the hydrogen gas before reforming is defined as "completion of the reforming reaction."

On the other hand, in dephosphorization blowing in which an exhaust gas flow rate is originally small and exhaust gas recovery rate is low, in recent years it is performed that waste plastics or the like are introduced to increase the exhaust gas flow rate to increase recovery rate. In this case, a hydrogen gas concentration in an exhaust gas before reforming reaches from about 10 to 15 vol % due to hydrogen gas formed from auxiliary materials such as waste plastics. Furthermore, in a bottom-blowing converter, LPG or the like is supplied as a cooling gas to prevent damage of a tuyere and, due to this, a large amount of hydrogen gas is generated even by decomposition of LPG. In the case that such a large amount of hydrogen gas is generated, increased amount of a hydrogen gas concentration in an exhaust gas after reforming is merely about 1 to 5 vol % as compared with a hydrogen gas concentration before reforming. Therefore, it is preferred in dephosphorization blowing and a bottom-blowing furnace that when hydrogen gas is increased 1 vol % or more as compared with hydrogen gas before reforming is defined as "completion of the reforming reaction."

The exhaust gas temperature is decreased by the progress of the reforming reaction. Therefore, completion of the reforming reaction when an exhaust gas temperature after reaction is 800° C. or higher has physical meaning On the other hand, hydrogen atom originated from the reducing agent added converts to hydrogen gas by a reforming reaction. In a process in which an exhaust gas is recovered as an energy source, analysis of an exhaust gas composition is essential, and monitoring completion of a reaction by a hydrogen gas concentration has chemical meaning and is important as operation control.

In the above description, the stoichiometry of a carbon dioxide gas reforming reaction means that (X−Z) mol of carbon dioxide gas reacts with 1 mol of a reducing agent as shown in the following formula (4). In general, injection of an equivalent amount of a reducing agent is preferred. However, in the case that an offgas temperature at the addition position is not so high as compared with 800° C. which is the lower limit temperature of reaction completion at a position of the thermometer 10, a reducing agent is preferably added in an amount smaller than the equivalent amount. For example, in the case that a carbon dioxide gas concentration in a converter offgas is 15 vol % and methane is used as a reducing agent, (X−Z)=1 is the equivalent amount. Therefore, when the offgas temperature at the injection position is 1,600° C. or higher, methane in an amount equal to the amount of carbon dioxide gas is added. On the other hand, when the offgas temperature at the injection position is 1,200° C., about ⅔ of the equivalent amount is an appropriate addition amount. The "appropriate addition amount" used herein means an amount that a reforming agent is completed at a position showing that the calorie-upgraded offgas temperature is 800° C. or higher.

In the reforming reaction shown by the formula (1) or the following formula (4), the lower limit of a carbon dioxide gas concentration is not theoretically present. However, the fact that the effect by blowing a reducing agent, that is, calorie-upgrading effect, is decreased with decreasing a carbon dioxide gas concentration is apparent. The reality is that the calorie-upgrading effect is small when a carbon dioxide gas concentration is less than 3 vol %, and this is uneconomical. On the other hand, a reaction rate is locally very increased in the vicinity of a reducing agent blowing position with increasing a carbon dioxide gas concentration. As a result, the offgas temperature is locally remarkably decreased, and there is a possibility that an oxygen converter gas recovery system is damaged by thermal shock and the like. The carbon dioxide gas concentration exceeding 30 vol % is not preferred from the standpoint of stable operation of a oxygen converter and equipment maintenance.

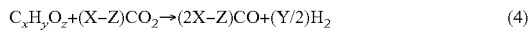

$$C_xH_yO_z+(X-Z)CO_2 \rightarrow (2X-Z)CO+(Y/2)H_2 \quad (4)$$

The gas residence time of from the addition position of a reducing agent to the position of the thermometer 10 is a range of preferably from 0.01 to 50 seconds, and more preferably from 0.1 to 20 seconds. The reason that the gas residence time is 0.01 second or more is to obtain a sufficient reaction time for completing a reforming reaction. A reducing agent is not leaked, which is economical. The reason that the gas residence time is 50 seconds or less is that 50 seconds or less are the upper limit which surely completes a reaction and does not require to make a duct long, and offgas equipment can be suppressed inexpensively.

For example, to add methane in an equivalent amount of carbon dioxide gas in the case that a carbon dioxide gas concentration in a converter offgas is 15 vol %, methane is used as a reducing agent and an offgas temperature at the addition position is 1,600° C. or higher, when the residence time is from 0.5 to 5 seconds, the reforming reaction can be completed, and the gas temperature at the time of completion of the reaction is 800° C. or higher.

The addition position of a reducing agent is preferably determined considering the gas residence time and the offgas temperature at the addition position. For example, in the case that the gas residence time is from 0.01 to 50 seconds, and preferably from 0.1 to 20 seconds, as described above, the addition position of a reducing agent is preferably a position at which the offgas temperature is as high as possible. FIG. 1 is an example of injecting a reducing agent from a side pipe of an oxygen top blowing lance. Thus, the reason that a lance 11 is noted as the addition position in Example A is that the lance 11 is an indispensable equipment for operation of a top blowing converter, and it is practical to use this for addition of a reducing agent. However, the addition position is not limited to only the side pipe part of a lance in Example A. For example, a nozzle is installed to the skirt 2, or an upper part of the upper hood 4 and the lower hood 3, and a reducing agent may be added through the nozzle.

Particularly, in the case that a carbon dioxide gas amount in a converter offgas is relatively small, a reaction time may be short. Therefore, a reducing agent may be added at a position further upper than the lower hood 3 or the upper hood 4, for example, at a lower end of a first radiation part. The addition position is not limited to one position, and may be plural positions. For example, a reducing agent may be added at two positions of a side pipe of the lance 11 and an upper part of the lower hood 3.

At least one fossil resource type compound of materials selected from natural gas, liquefied petroleum gas, methane, ethane, light naphtha, raffinate, methanol, ethanol, dimethyl ether and diethyl ether is preferably used as a reducing agent that can be used in Example A. Of those, natural gas, liquefied petroleum gas, light naphtha, raffinate and diethyl ether are preferred in that those have good reactivity with carbon dioxide gas and are easily available inexpensively and in a large amount.

The reducing agent may use nonfossil resource type organic compounds together with the fossil resource type compounds or in place of those. Use of the nonfossil resource type organic compounds is particularly preferred in that a reforming reaction is conducted by a carbon-neutral reducing agent, in addition to a portion that offgas is calorie-upgraded by a carbon dioxide gas reforming reaction, and this can greatly contribute to emission reduction of carbon dioxide gas. Examples of the nonfossil resource type organic compound include bioethanol, biodiesel and a mixture of those.

In the case of using a reducing agent which is gas at room temperature such as natural gas or liquefied petroleum gas, a nozzle suitable for gas blowing is used, and a shape of a nozzle and the number of nozzles are not particularly limited. In the case of a reducing agent which is liquid at room temperature, such as raffinate, bioethanol or biodiesel, the reducing agent may be sprayed in a mist state and injected, or may be gasified and injected in a form of gas. In the case of supplying in a mist state, its droplet diameter is such that contact with carbon dioxide gas is efficient, and is preferably from 0.01 to 1,000 µm, and more preferably from 0.1 to 100 µm.

In the case of using a liquefied gas such as dimethyl ether, or liquefied gas of nonfossil resource type organic compounds as a reducing agent, the reducing agent may previously be gasified and injected as gas, or may be supplied by supplying the reducing agent in a form of a liquid and gasifying the reducing agent near a nozzle or in a nozzle. In this case, the case of gasifying the reducing agent near the nozzle or in the nozzle is that the nozzle is cooled by heat of evaporation, and therefore is preferred in protection of the nozzle.

We further provide a production method of a reformed gas, comprising adding a reducing agent to an exhaust gas containing high temperature carbon dioxide gas, discharged from a metallurgical furnace, thereby reacting the carbon dioxide gas and the reducing agent, wherein the reducing agent is added when an oxygen concentration in the exhaust gas is 1 vol % or less, and the reforming reaction is completed when an exhaust gas temperature is 800° C. or higher.

The term "reformed gas" as a product used herein means a gas generated by completion of the reforming reaction between carbon dioxide gas in the exhaust gas and the reducing agent. The term "completion of the reforming reaction" is the same as defined before. Therefore, in decarbonization blowing, a gas in which hydrogen gas has been increased two times or more the amount before reforming is called "reformed gas" which is a product of our method. In dephosphorization blowing or bottom-blowing converter, a gas in which hydrogen gas has been increased 1 vol % or more the amount before reforming is called "reformed gas" which is a product of our method.

The "reformed gas" decreases a carbon dioxide gas concentration and increases hydrogen and carbon monoxide concentrations, by a reforming reaction. Therefore, combustion heat of a gas is increased from about 5 to 30% as compared with an unreformed exhaust gas. However, the combustion heat is not a measured value, and generally indicates a calculated value from a gas composition. Therefore, the "reformed gas" is preferably defined by the change of a hydrogen gas concentration as described before.

The reducing agent preferably is at least one fossil resource type compound selected from the group consisting of natural gas, liquefied petroleum gas, methane, ethane, light naphtha, raffinate, methanol, ethanol, dimethyl ether and diethyl ether.

The reducing agent preferably is at least one nonfossil resource type compound selected from the group consisting of bioethanol, biodiesel and a mixture of bioethanol and biodiesel.

In practicing the above-described offgas reforming method, Example A proposes as a reforming apparatus accelerating a reforming reaction between carbon dioxide gas contained in offgas and a reducing agent, a reforming apparatus of a metallurgical furnace generated exhaust gas comprising a concentration measurement device measuring an oxygen concentration in the exhaust gas, in an oxygen converter gas recovery system; a flow passage changeover device performing flow passage changeover of exhaust gas pipe lines according to an oxygen concentration in a reformed offgas on the basis of output from the concentration measurement device, that is, according to whether or not the oxygen concentration is larger than or smaller than 1 vol %; a temperature measurement device measuring a temperature of the reformed offgas calorie-upgraded by a reforming reaction; a flow rate control device controlling an addition (injection) amount of the reducing agent, operated by output from the temperature measurement device and output of the concentration measurement device; and a reducing agent blowing device for adding the reducing agent controlled by operation of the flow rate control device to the offgas from a predetermined position, for example, a nozzle installed to a side pipe part of the top blowing lance or a skirt.

In Example A, the gas analyzer 6 installed to an upstream side of the primary dust collector 5 or the secondary dust collector 13, for example, the inside of a downstream pipe passage of a second dust catcher, or both is used as the concentration measurement device, an apparatus in which the gas flow channel changeover valve 8 controlled so as to open or shut by output of the oxygen concentration value of the gas analyzer 6 is installed to the branched part of a flow passage to the flare 9 and a flow passage to a gas holder (not shown) such that any one of the flow passage to the flare 9 and the flow passage to a gas holder can be selected, is used as the flow passage changeover device, and the temperature measurement device is constituted of the thermometer 10 installed to a boundary part with a radiation part of a exhaust duct hitting the entry side of the primary dust collector 5. A gas flow meter 15 measuring a flow rate of offgas is preferably provided in the downstream side of a secondary dust collector in the oxygen converter gas recovery system.

Control system of the above reforming apparatus is shown by a dot line in FIG. 1. In this drawing, a flow rate control value 7 for supplying a reducing agent is only one, and the valve is controlled by one or both of output of the gas analyzer 6 for oxygen concentration measurement and output of the thermometer 10 for temperature measurement. However, two control valves not shown may be used and separately controlled through a calculation apparatus 12, and the gas flow channel changeover valve 8 may be controlled by output of the gas analyzer 6 and, at the same time, may be controlled by output of the thermometer 10 by providing other control valve at the downstream side of the changeover valve.

EXAMPLE 1

This example is an example in which a test of adding natural gas to offgas from an upper hood 4 was conducted using a top blowing converter of 300 t. The offgas when natural gas is not blown had a flow rate of 79,000 Nm$^3$/hr, and a gas composition of CO: 50 vol %, $CO_2$: 15 vol %, $H_2$: 1 vol % and $N_2$: 34 vol %. This means that $CO_2$ was discharged in an amount of 11,850 Nm$^3$/hr.

This corresponds to 122,000 t/year in terms of carbon dioxide gas weight per one year. The natural gas added was 11,850 Nm$^3$/hr equal to $CO_2$ flow rate. $CH_4$ content in the natural gas was 92 vol %. Therefore, a molar ratio between $CO_2$ and $CH_4$ can be approximated into nearly 1:1. The offgas temperature near the converter throat was about 1,700° C.

A flow meter 15 of offgas and the gas analyzer 6 were installed at a downstream side of the secondary dust collector (dust catcher) 13, and the thermometer 10 was installed at an upstream side of the primary duct collector (wet dust collector) so that the amount of natural gas added could be controlled by an oxygen concentration of offgas and a reformed offgas temperature. Oxygen was leaked just after initiation of blowing. Therefore, the addition of natural gas was then initiated when the oxygen concentration became 1 vol % or less, and a temperature, a flow rate and a composition of the reformed offgas were monitored. As a result, the offgas had a temperature of 980° C. and a flow rate of 114,400 Nm$^3$/hr, and a composition was CO: 55 vol %, $CO_2$: 0.1 vol %, $H_2$: 21 vol %, $N_2$: 23.5 vol %, $CH_4$: 0.1 vol % and $O_2$: less than 0.1 vol %. Considering the equilibrium, the reforming reaction was completed at a temperature measurement position. Formation and deposition of dust such as carbon in a duct were not observed, and offgas could be reformed without any problem. Hydrogen gas amount was increased 21 times by the reforming reaction, and the reforming reaction was completed at 980° C. Gas residence time of from the addition position of natural gas to the temperature measurement position was about 4.5 seconds.

Combustion heat of offgas before reforming was 1,537 kcal/Nm$^3$, and the combustion heat thereof after reforming was 2,220 kcal/Nm$^3$, which was calorie-upgraded 44% in offgas volume standard. The offgas flow rate was 1.45 times. Therefore, it was seen that calorie-upgrading amount is very large. However, the calorie-upgrading amount includes amount of heat of natural gas added as a reducing agent. Therefore, true calorie-upgrading rate excluding the amount of heat was 29%. Emission reduction of carbon dioxide gas contributing to reduction in an auxiliary fuel corresponding to this calorie-upgrading portion is calculated as an amount corresponding to 105,000 t/year.

Comparative Example 1

Addition test of a reducing agent was conducted in the same manner as in Example 1, except that the addition position of natural gas was changed to a position at which an offgas temperature is 1,300° C., which is a downstream side than Example 1. The offgas after reforming had a temperature of 770° C., and a composition of CO: 47 vol %, $CO_2$: 4 vol %, $H_2$: 20 vol %, $N_2$: 23.5 vol %, $CH_4$: 0.3 vol % and $O_2$: less than 0.1 vol %. Thus, 4 vol % of $CO_2$ was leaked. Furthermore, carbon was formed in an amount of about 4% by weight, and was deposited in a duct. Hydrogen gas amount was increased 20 times by the reforming reaction, and the reforming reaction was completed at 770° C. Gas residence time of from the addition position of natural gas to the temperature measurement position was about 3.5 seconds.

EXAMPLE 2

This example is an example in which a test was conducted using a simulant test furnace comprising an alumina tube having an inner diameter of 12 mm and a length of 5 m. The simulant test furnace was that a gas inlet was installed to an upstream flange of the aluminum tube and a methane gas introduction piping having an outer diameter of 3 mm and a thermocouple protecting pipe were installed to the upstream flange. Addition of methane gas was a position of 1.5 m from the upstream flange, measurement control of a gas temperature was a position of 1 m from the upstream flange, and the methane introduction pipe and the thermocouple protecting pipe were passed through the flange. A thermocouple insertion port and a gas cooling equipment by water cooling were installed to the downstream flange, and an integrating gas flow meter and a gas analyzer were installed to the downstream side of the gas cooling equipment. The entire alumina tube was covered with an electric furnace. Current was applied to only a 1 meter heater of the upstream side, and this part was made as a preheating zone of a oxygen converter simulant gas. Current was not applied to a downstream heater lower than the upstream heater, and the part was made as an adiabatic reaction zone. Methane is poured at a position of about 0.5 m downstream side of the preheating zone as described before. Therefore, the length of the actual adiabatic reaction zone is 3.5 m.

A mixed gas of CO: 50 vol %, $CO_2$: 15 vol %, $H_2$: 1 vol % and $N_2$: 34% was prepared as a oxygen converter simulant gas. Simulant gas flow rate was set to 1 liter/min, methane gas flow rate was set to 150 ml/min which is equivalent to the flow rate of $CO_2$, and a reforming reaction test was conducted by changing a temperature of a preheating zone to 1,800° C., 1,500° C., 1,300° C., 1,100° C. and 900° C. As a result of measuring an outlet temperature of an adiabatic reaction zone by a thermocouple installed to the downstream flange in this example, the output temperatures were 1,060° C., 840° C., 775° C., 735° C. and 705° C. in each test of the preheating zone temperatures of 1,800° C., 1,500° C., 1,300° C., 1,100° C. and 900° C., respectively. Hydrogen gas concentrations at the outlet were 21 vol %, 20 vol %, 19 vol %, 18 vol % and 17 vol %, respectively. The gas residence time in the adiabatic zone was from 2 to 6 seconds.

Figure 2:
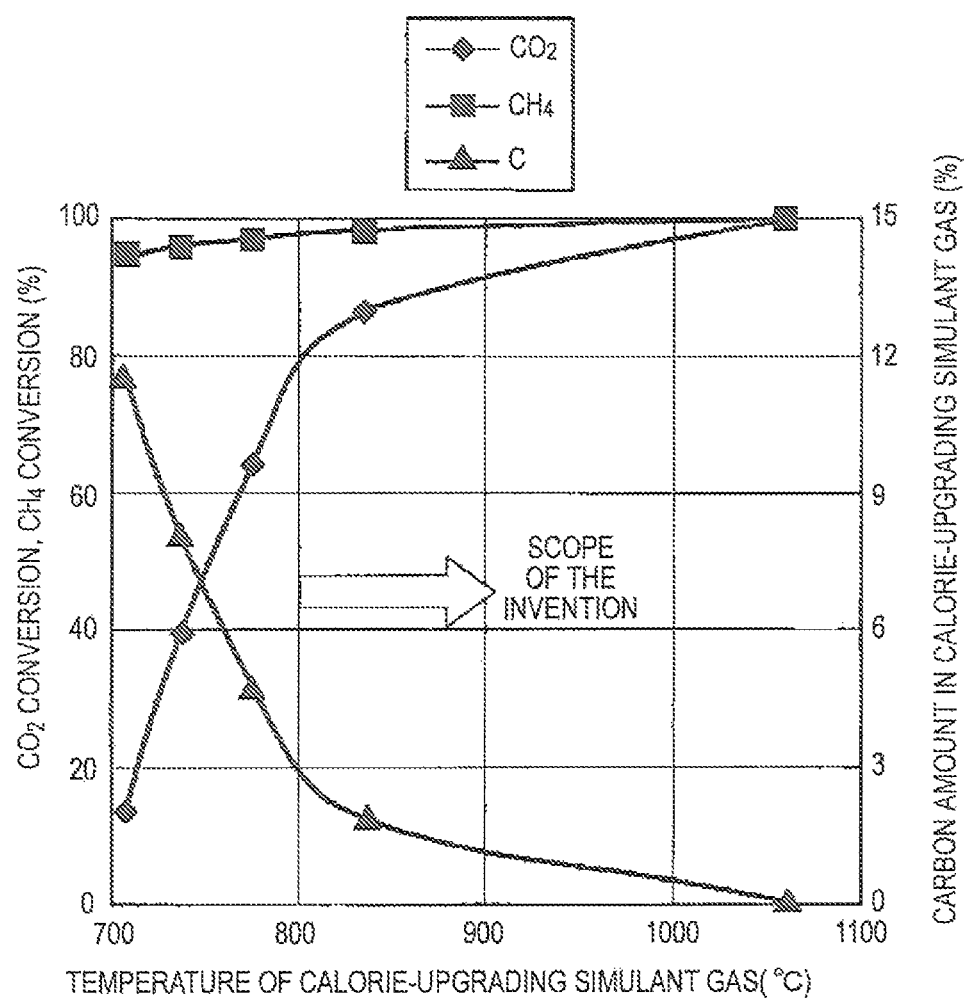
FIG. 2 is a graph showing the relationship among an outlet temperature of a calorie-upgrading stimulant gas, $CO_2$ and $CH_4$ conversions, and C amount according to Example A.

Conversion and material balance were calculated from a flow rate of an outlet gas and results of gas analysis. Formation of carbon was conducted by visually observing the inside of the piping after the test. Because of a small-scale test, it was difficult to quantify the carbon formation. Therefore, difference between material balance measured value (%) of C atom and 100(%) was considered as formation amount of carbon. In FIG. 2, an outlet temperature (indicated as temperature of calorie-upgraded simulant gas in FIG. 2) was shown in a horizontal axis, $CO_2$ and $CH_4$ conversions were shown in a left vertical axis, and a carbon formation amount was shown in a right vertical axis. As shown in FIG. 2, formation of carbon was not visually observed in the test that the temperature of a calorie-upgraded simulant gas is 1,060° C. (the case that the preheating zone temperature is 1,800° C.). However, formation of carbon was remarkable in the test that the calorie-upgraded simulant gas temperature is lower than 800° C. (the case that the preheating zone temperature is from 1,300° C. to 900° C.).

It is apparent from FIG. 2 that by controlling such that the reforming reaction is completed at a position that offgas temperature calorie-upgraded by a reforming reaction is 800° C. or higher, high carbon dioxide gas conversion and high calorie-upgrading effect can be achieved and, additionally, formation of carbon which is the cause of clogging of a duct can be suppressed.

EXAMPLE 3

Figure 3:
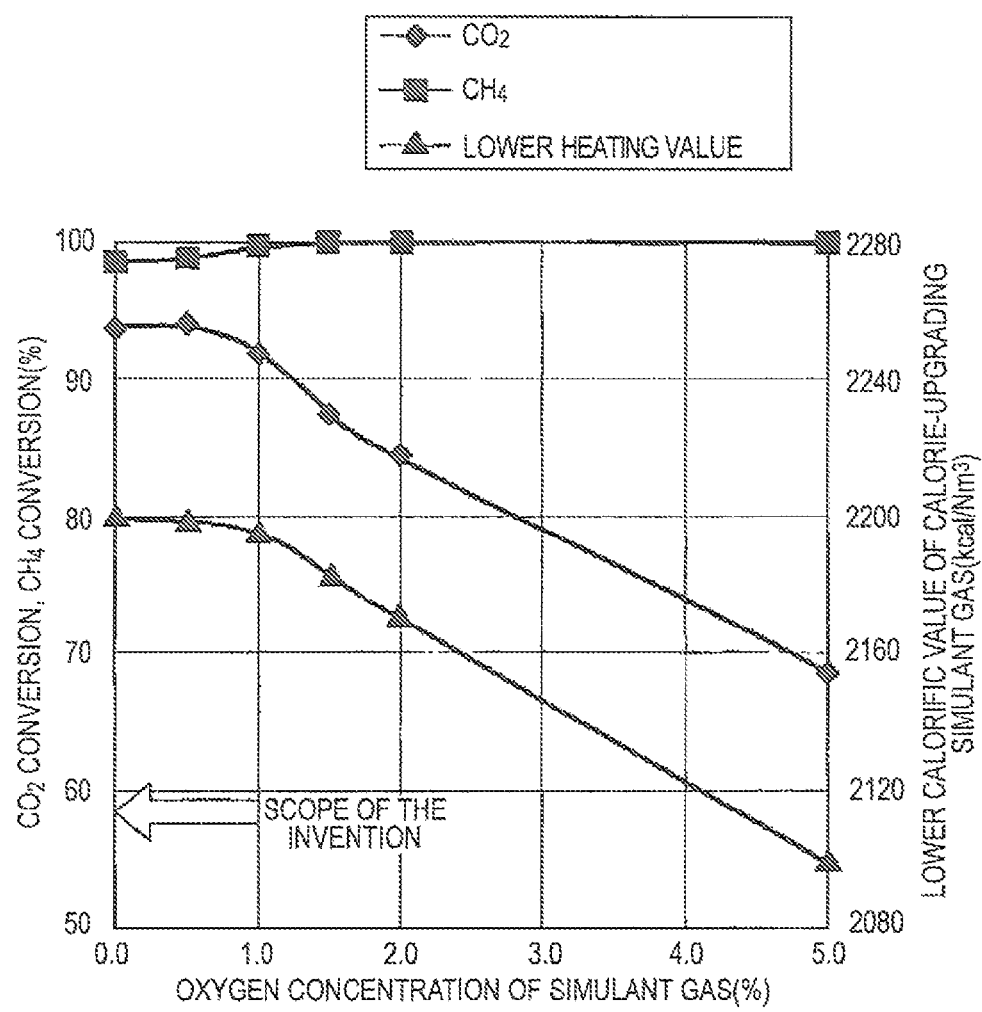
FIG. 3 is a graph showing the relationship among an oxygen concentration of a calorie-upgrading stimulant gas, $CO_2$ and $CH_4$ conversions, and a lower heating value according to Example A.
Figure 4:
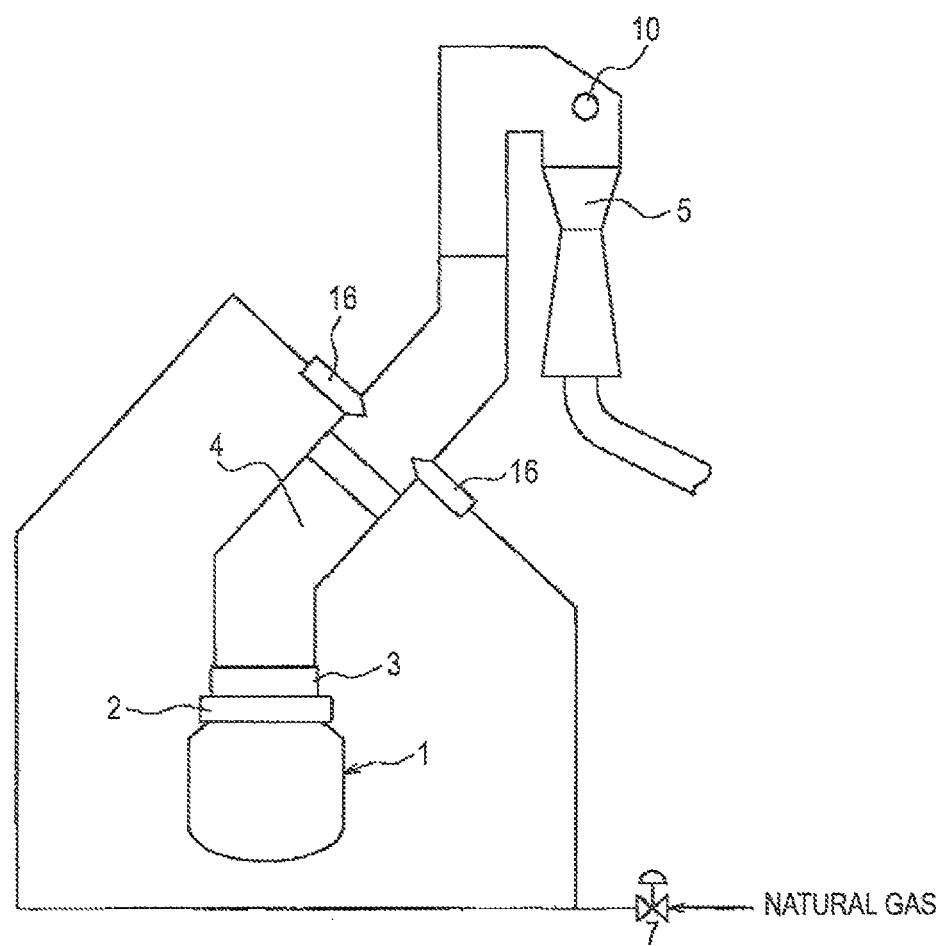
FIG. 4 is a schematic view of a reforming apparatus of an oxygen converter exhaust gas according to Example A.

A reforming reaction test was conducted in the same manner as in Example 2, except that gases having a converter simulant gas composition shown in Table 1 are used and a preheating zone of a simulant gas is 1,600° C. The temperature of the calorie-upgraded simulant gas was 800° C. or higher in all cases. In FIG. 3, an oxygen concentration in a simulant gas was shown in a horizontal axis, $CO_2$ and $CH_4$ conversions were shown in a left vertical axis, and a lower calorific value obtained from a gas composition was shown in a right vertical axis. As is apparent from FIG. 3 and Table 1, in test Nos. 3-4 to 3-6 in which an oxygen concentration in a simulant gas is larger than 1%, $CH_4$ conversion is high, but $CO_2$ conversion and low calorific value were greatly decreased. This indicates that as a result of formation of $H_2O$ by oxygen in a simulant gas, $H_2O$ reforming reaction of $CH_4$ proceeds. For the sake of reference, a hydrogen gas concentration at an outlet is shown in Table 1.

TABLE 1

| | | | Test No. | | | (Vol %) |
| --- | --- | --- | --- | --- | --- | --- |
| | 3-1 | 3-2 | 3-3 | 3-4 | 3-5 | 3-6 |
| CO | 50 | 50 | 50 | 50 | 50 | 50 |
| $CO_2$ | 15 | 15 | 15 | 15 | 15 | 15 |
| $H_2$ | 1 | 1 | 1 | 1 | 1 | 1 |
| $N_2$ | 34 | 33.5 | 33 | 32.5 | 32 | 29 |
| $O_2$ | 0 | 0.5 | 1 | 1.5 | 2. | 5 |
| Outlet $H_2$ | 21 | 21 | 21 | 21 | 20.5 | 18 |

As is apparent from FIG. 3, it was clarified that high carbon dioxide gas conversion and high calorie-upgrading effect can be achieved by controlling such that addition initiation of a reducing agent is when an oxygen concentration in offgas became 1 vol %.

EXAMPLE 4

This example is an example in which a test was conducted using bioethanol gasified by heating with a heater, as a reducing agent and using the simulant test furnace comprising the same alumina tube as in Example 1. This simulant test furnace was that a gas inlet was installed to an upstream flange of the alumina tube and a bioethanol gas introduction piping having an outer diameter of 3 mm and a thermocouple protecting pipe were installed to the upstream flange. The bioethanol gas introduction pipe and the thermocouple protecting pipe pass through the flanges such that addition of bioethanol gas is a position of 1.5 m from the upstream flange and measurement control of a gas temperature is a position of 1 m from the upstream flange. A thermocouple insertion opening and a gas cooling equipment by water-cooling are installed to the downstream flange, and an integrating gas flow meter and a gas analyzer are installed at a downstream side of the gas cooling equipment. The whole alumina tube is covered with an electric furnace. However, current was applied to only a 1 m heater of the upstream side, and this part was used as a preheating zone of a converter simulant gas. Current was not applied to a downstream heater lower than the upstream heater, and this part was used as an adiabatic reaction zone. The bioethanol gas is injected at a position of about 0.5 m downstream side of the preheating zone as described before. Therefore, length of the actual adiabatic reaction zone is 3.5 m.

A mixed gas of CO: 50 vol %, $CO_2$: 15 vol %, $H_2$: 1 vol % and $N_2$: 34% was prepared as a converter simulant gas. Simulant gas flow rate was set to 1 liter/min, bioethanol gas flow rate was set to 150 ml/min which is equivalent to the flow rate of $CO_2$, and the preheating zone temperature was set to 1,500°

C. In this case, an outlet temperature of the adiabatic reaction zone by the thermocouple installed to the downstream flange was 820° C. Furthermore, a hydrogen gas concentration at the outlet was 20 vol %. Gas residence time in the adiabatic zone was 3 seconds. As a result of calculation of a conversion and a material balance from a flow rate of an outlet gas and a gas analyst result, bioethanol conversion was 99%, $CO_2$ conversion was 89%, and carbon formation rate was 1.5%. Formation of carbon was conducted by visually observing the inside of the piping after the test. Difference between a material balance measured value (%) of C atom and 100(%) was used as a carbon formation amount. This reaction can be represented by the formula (5), and as a result, ⅔ of CO formed is derived from nonfossil resources. Therefore, even though a synthetic gas generated is burned as a fuel, carbon dioxide gas emission is merely ⅓, and it is apparent to have a great carbon dioxide gas emission reduction effect.

$$CO_2+C_2H_5OH \rightarrow 3CO+3H_2 \tag{5}$$

EXAMPLE 5

Addition test of a reducing agent was conducted in the same manner as in Example 1, except that a blowing opening 16 of the reducing agent is provided at a lower end of a first radiation part at the upper part of an upper hood 4, and addition amount of natural gas is 3,360 $Nm^3$/h. Offgas temperature at the addition position was about 1,300° C. which is equivalent to that of Comparative Example 1, but this example differs from Comparative Example 1 in the point that an addition amount of natural gas is small. The offgas after reforming had a temperature of 940° C., a flow rate of 77,280 $Nm^3$/h, and a composition of CO: 63 vol %, $CO_2$: 7 vol %, $H_2$: 8 vol %, $N_2$: 21 vol %, $CH_4$: less than 0.1 vol % and $O_2$: less than 0.1 vol %. Hydrogen gas amount was increased 8 times by the reforming reaction, and the reforming reaction was completed at 940° C. at the temperature measurement position. Differing from Comparative Example 1, formation and deposition of dust such as carbon on the duct were not observed, and offgas could be reformed without any problem. Gas residence time of from the addition position of natural gas to the temperature measurement position was about 4 seconds.

EXAMPLE B

A reforming apparatus of a metallurgical furnace exhaust gas according to Example B is an apparatus in which a reducing agent and the like are added to high temperature exhaust gas of 800° C. or higher, and preferably 1,000° C. or higher, discharged from a metallurgical furnace such as a oxygen converter or a smelting reduction furnace to derive a reforming reaction between carbon dioxide gas contained in the exhaust gas and the reducing agent, thereby reforming the exhaust gas, and is characterized in that a reducing agent-blowing nozzle having a concentric double pipe structure comprising an outer pipe for blowing diluted nitrogen and an inner pipe for blowing a reducing agent, fitted together by insertion in the outer pipe is installed to an exhaust gas duct of the metallurgical furnace.

The constitution of Example B is described below by reference to an example using a oxygen converter as a metallurgical furnace.

High temperature exhaust gas discharged from a oxygen converter generally contains from about 10 to 20 vol % of $CO_2$ and from about 50 to 80 vol % of CO, a calorific value is from about 1,500 to 2,000 kcal/$Nm^3$, and a temperature at a throat portion during operation of the oxygen converter is from about 1,200 to 1,800° C. The apparatus of Example B simultaneously and safely achieves calorie-upgrading of offgas and emission reduction of carbon dioxide gas by adding a reducing agent such as natural gas to the converter offgas to derive a reforming reaction between the reducing agent and carbon dioxide gas of the following formula (1):

$$CH_4+CO_2 \rightarrow 2CO+2H_2 \tag{1}$$

Figure 5:
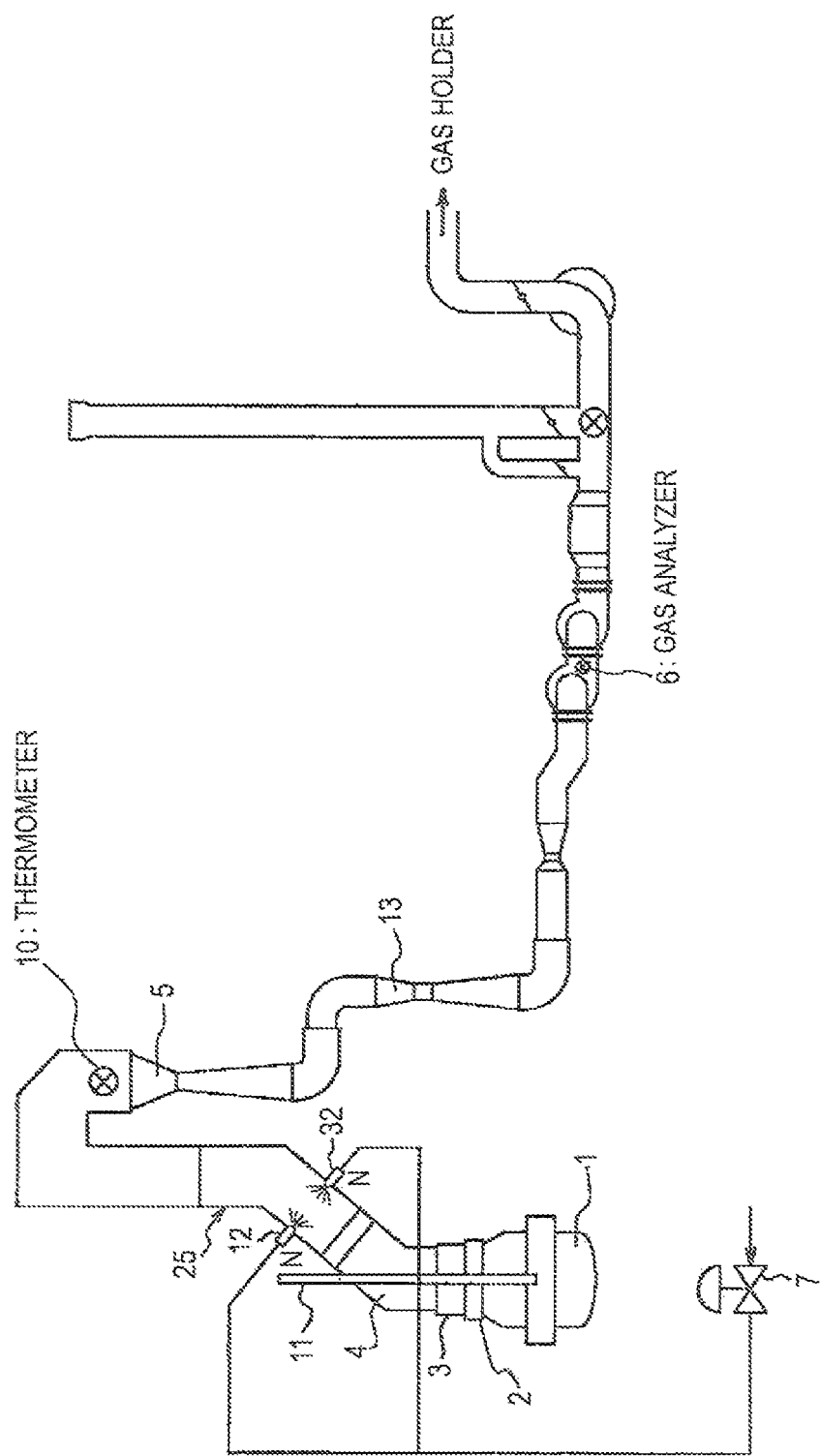
FIG. 5 is a schematic view of a reforming apparatus of an oxygen converter exhaust gas according to Example B.

That is to say, because calorie-upgraded and reformed offgas is used as various heat sources in steelworks (for combustion), carbon dioxide gas is finally emitted. However, an auxiliary fuel such as heavy oil used in steelworks can be reduced in an amount corresponding to the calorie-upgrading portion, and as a result, the amount of carbon dioxide gas generated can be reduced in the corresponding amount. FIG. 5 is a schematic diagrammatic view of an oxygen converter gas recovery system of a oxygen converter for explaining a reforming apparatus of a metallurgical furnace exhaust gas according to Example B. As shown in FIG. 5, offgas generated from a oxygen converter 1 is discharged through a skirt 2, a lower hood 3, an upper hood 4, a first radiation part 25, a primary dust collector (wet dust collector) 5, a secondary dust collector 13, and the like.

Figure 6:
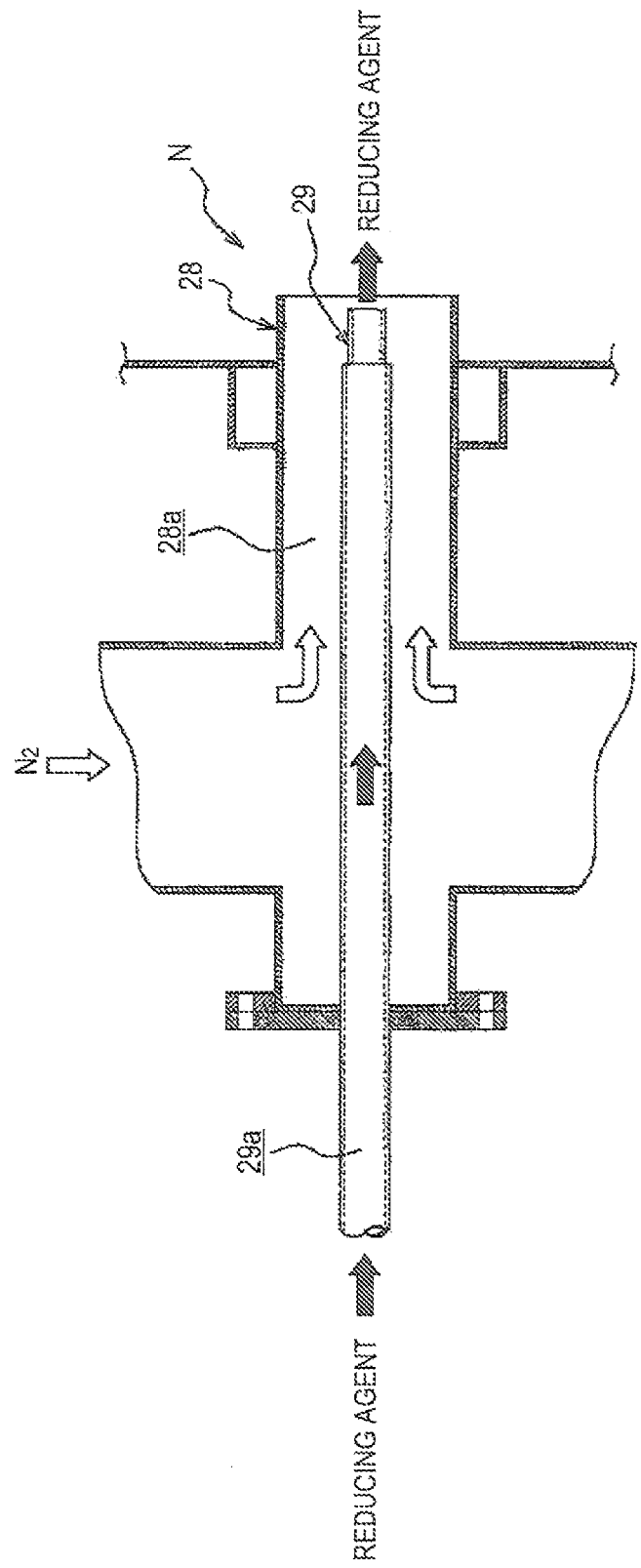
FIG. 6 is a cross-sectional view of a reducing agent blowing nozzle according to Example B.

FIG. 6 is an example of a preferred reducing agent blowing nozzle N used in Example B.

The reforming apparatus according to Example B is preferably that the reducing agent blowing nozzle N having a concentric double pipe structure, comprising the outer pipe 8 for blowing diluted nitrogen and the inner pipe 9 for blowing a reducing agent such as natural gas is preferably installed to an exhaust gas duct of a oxygen converter, that is, any position of the lower hood 4, the upper hood 4 and the radiation part 25, at one to plural places in the duct circumferential direction. For example, the total four nozzles are installed from two places as two nozzles being one pair.

The reducing agent blowing nozzle N can jet a reducing agent described hereinafter from a central passage 29a formed by the inner pipe, and can jet diluted nitrogen such as diluted nitrogen for emergency stop from a ring-like passage 28a formed by a space between the outer pipe 28 and the inner pipe 29.

Jet of the diluted nitrogen and jet of the reducing agent such as natural gas are conducted in an independent state, respectively. The former is, for example, the case at the time of injection of diluted nitrogen for emergency stop operating when there is danger of explosion due to temperature rise of a converter exhaust gas. On the other hand, the latter is the case of jetting a reducing agent supplied to attempt reforming and calorie-upgrading of an exhaust gas. Of course, those can simultaneously be jetted, and this case has a function to control a reducing agent blowing gas concentration.

Generally, in an oxygen converter gas recovery system having such a converter exhaust gas duct, an emergency stop diluted nitrogen blowing nozzle 32 is provided at a lower part of the first radiation part 25, near the upper end of the upper hood 4, in the example shown. Preferably, the existing diluted nitrogen blowing nozzle 32 is utilized. This nozzle is used as the outer pipe 28 and the reducing agent blowing inner pipe 29 is fitted together by insertion in a central portion inside the outer pipe 28, thereby constituting the reducing agent blowing nozzle N having a concentric double pipe structure. In this case, because the existing diluted nitrogen blowing nozzle 12 is utilized as it is, construction cost can greatly be reduced.

The reason for utilizing the emergency stop diluted nitrogen blowing nozzle 32 is that because diluted nitrogen for emergency stop is generally employed to blow a large amount of nitrogen in a converter exhaust gas duct comprising from the skirt 2 to the radiation part 25 for the purpose of preventing explosion by high temperature exhaust gas in a time emergency during operation of a oxygen converter. The diluted nitrogen blowing nozzle generally comprises from about 2 to 8 nozzles having a large inner diameter of from about 200 to 300 mm placed on a dust peripheral wall, and is generally used only in a time of emergency. A diluted nitrogen blowing nozzle having a large diameter, that is, the outer pipe 28, the reducing agent blowing pipe 9 having a diameter smaller than the nozzle is inserted in the inside thereof at a central portion in an axis direction, thereby constituting a double pipe structure.

The above-described diluted nitrogen nozzle 32 is the existing nozzle. Therefore, it is not necessary to prepare a nozzle by adding a reducing agent flowing function to an oxygen converter gas recovery system and the lance 11 and newly designing a nozzle, and the reducing agent blowing inner pipe 29 is merely mounted in the inside of the outer pipe 28 as the diluted nitrogen blowing nozzle, which is advantageous in easy installation and inexpensiveness.

The converter exhaust gas duct equipment is generally that other than the above-described emergency stop diluted nitrogen blowing nozzle 12, flanges for installing scaffolding when entering the duct for the purpose of inspection are installed at plural places, in addition to manholes as an inspection hole. The above example proposed to use the nitrogen blowing pipe of the existing emergency stop diluted nitrogen blowing nozzle 32 as the outer pipe of the reducing agent blowing nozzle. However, it is possible to install the reducing agent blowing nozzle N having a concentric double pipe structure of the embodiment 2 to the existing manholes and scaffoldings.

A plurality of the reducing agent blowing nozzle N is generally installed in a circumferential direction of the exhaust gas duct. However, only a part of the existing diluted nitrogen blowing nozzle 32 may be utilized and the nozzle N may be installed thereto, and the nozzle N may be installed to all of the nozzles 12. The installation of the reducing agent blowing nozzle N is the same even in the case of utilizing the above-described manholes and the flange.

Blowing a reducing agent in a converter exhaust gas duct in a state of being filled with high temperature exhaust gas is preferably conducted from the reducing agent blowing nozzle N installed to a lower part of the first radiation part 25 in which an exhaust gas has high temperature of 800° C. or higher. This example is shown in FIG. 5. The exhaust gas temperature at the lower part of the first radiation part 5 in the converter exhaust gas duct is generally from about 1,100 to 1,400° C., and this is a sufficient temperature for the progress of a reforming reaction. On the other hand, oxygen is completely consumed by a combustion reaction with carbon monoxide at this position, and flame does not soar up to this position. Therefore, an exhaust gas can be reformed and calorie-upgraded safely and efficiently, and in some cases, concentration control by diluted nitrogen may be conducted.

The reducing agent such as natural gas blown in high temperature exhaust gas of a oxygen converter from the reducing agent blowing nozzle N reacts with carbon dioxide gas in the exhaust gas to induce the reaction of the formula (1), thereby absorbing sensible heat of the exhaust gas. Therefore, the exhaust gas temperature is decreased with the progress of the reaction. With the progress of the reaction, an exhaust gas flow rate, a carbon monoxide concentration and a hydrogen concentration are increased, and on the other hand, a carbon dioxide gas concentration is decreased. In FIG. 5, a reaction is monitored with the thermometer 10, the gas analyzer 6, a gas flow meter (not shown), and the like. The flow rate control valve 7 of the reducing agent and a reducing agent supply pressure (not shown) may be controlled using those measured values. The first dust collector 5 is a wet dust collector. Therefore, an exhaust gas is quenched in the dust collector, and an area up to just before the first dust collector 5 is a space that can be utilized in the reaction.

The reducing agent is preferably at least one material selected from natural gas, liquefied petroleum gas, methane, ethane, light naphtha, raffinate, methanol, ethanol, dimethyl ether, diethyl ether, nonfossil resource type organic compounds such as bioethanol and biodiesel, and a mixture thereof. Of those, natural gas, liquefied petroleum gas, light naphtha, raffinate and dimethyl ether are preferred in that those have good reactivity with carbon dioxide gas, and are easily available in large amount. In the case of using a reducing agent that is a gas at room temperature, such as natural gas and liquefied petroleum gas, a nozzle suitable for gas blowing is used, and a nozzle shape and the number of nozzle are not particularly limited. In the case of a reducing agent that is a liquid at room temperature, such as raffinate, the reducing agent may be injected by spraying the reducing agent in a mist state, and may be gasified and injected in a form of a gas. In the case of supplying in a mist state, its droplet diameter is a diameter such that contact with carbon dioxide gas is efficient, and is preferably from 0.01 to 1,000 μm, and more preferably from 0.1 to 100 μm. In the case of using liquefied gas such as dimethyl ether as a reducing agent, the reducing agent may previously be gasified and injected as a gas, and may be supplied by supplying in a form of a liquid and gasifying the reducing agent near a nozzle or in a nozzle. In this case, in the case of gasifying near a nozzle or in a nozzle, the nozzle is cooled by heat of evaporation, and this is preferred in the point of protection of the nozzle.

The reducing agent may use nonfossil resource type organic compounds together with the fossil resource type compounds or in place of those. When the nonfossil resource type organic compounds are selected as a reducing agent, a reforming reaction is conducted by a carbon-neutral reducing agent, in addition to the portion of which offgas is calorie-upgraded by a carbon dioxide gas reforming reaction, and this is preferred in point of being capable of greatly contributing to carbon dioxide gas emission reduction. Examples of the nonfossil resource type organic compound include bioethanol, biodiesel and a mixture thereof. Bioethanol and biodiesel are generally a liquid at room temperature. Therefore, those preferably are injected by spraying in a mist state, or gasified and then injected as a gas. In the case of liquefied gas of the nonfossil resource type organic compound, the liquefied gas is preferably used in the same manner as in dimethyl ether as described above.

EXAMPLE 1

This example is an example that conducted a test of adding natural gas as a reducing agent to a oxygen converter exhaust gas (offgas) from the reducing agent blowing nozzle N installed utilizing the emergency stop diluted nitrogen blowing nozzle 32 provided in a lower part of the radiation part 25 shown in FIG. 5, using 300 t top blowing converter 1. The reducing agent blowing nozzles N of the reforming apparatus used in this example are installed with an equivalent width over the total four places in nearly the same height of an axis direction of a converter exhaust gas duct (radiation part), and an inner diameter of its outer pipe 28 is 200 mm. All of the reducing agent blowing nozzles N installed to four places are equipped with a reducing agent blowing inner pipe 29 having an inner diameter of 35 mm as shown in FIG. 6, and general pressure control valve and flow rate control valve, not shown in the drawing are fitted to the inside of the upstream piping of the reducing agent blowing inner pipe 29.

Prior to blowing natural gas as a reducing agent, it was confirmed as to whether or not there is no problem on flow of an emergency stop nitrogen gas. The nitrogen gas could be blown at 27,000 Nm³/h as the preset flow rate, and it was clarified that there is no problem on safety in operation of a oxygen converter. Offgas flow rate when natural gas is not blown was 67,000 Nm³/h, and the gas composition was CO: 60 vol %, $CO_2$: 15 vol %, $H_2$: 1 vol % and $N_2$: 24 vol %. This indicates that $CO_2$ was emitted in an amount of 10,050 Nm³/h. The amount of the natural gas added was 3,600 Nm³/h in the total of four reducing agent blowing nozzles N. Because $CH_4$ content of the natural gas was 92 vol %, a molar ratio between $CO_2$ and $CH_4$ can be approximated by 3:1. Although the offgas temperature near the reducing agent blowing nozzle N was not actually measured, it is estimated to be about 1,300° C. according to numerical analysis.

Under the practical conditions, supply pressure of natural gas was adjusted to 200 kPa in gauge pressure, and flow rate from each reducing agent blowing nozzle N was adjusted to be 900 Nm³/h. Oxygen was leaked just after initiation of blowing. Therefore, when an oxygen concentration became 1 vol % or less, addition of natural gas was initiated, and a temperature, a flow rate and a composition of the reformed offgas were monitored. As a result, the offgas had a temperature of 910° C., a flow rate of 78,000 Nm³/h, and a composition of CO: 64 vol %, $CO_2$: 6 vol %, $H_2$: 8 vol %, $N_2$: 22 vol %, and $CH_4$ and $O_2$: less than analytical limit. The entire amount of natural gas blown reacted with carbon dioxide gas, and there was no danger of combustion and explosion. It was further seen that formation and deposition of exhaust gas dust such as carbon in a duct (duct) were not observed, and the exhaust gas was efficiently reformed. Combustion heat of offgas before reforming was 1,840 kcal/Nm³, but the combustion heat after reforming was 2,140 kcal/Nm³. Thus, calorie-upgrading was 16% in offgas volume standard. Carbon dioxide gas flow rate in offgas after reforming is calculated as 4,680 Nm³/h, and conversion of carbon dioxide gas is 53%. Therefore, it was confirmed to be effective to employ our apparatus.

Example B has the following effects:

(1) An apparatus for reforming a metallurgical furnace exhaust gas can be an inexpensive equipment having a simple structure. Additionally, reforming and calorie-upgrading of an exhaust gas can be performed safely, and eventually, emission reduction of carbon dioxide gas can be achieved with high efficiency.

(2) Because an emergency stop diluted nitrogen blowing pipe originally provided in a metallurgical furnace oxygen converter gas recovery system is utilized, a whole new apparatus is not required to install for exhaust gas duct, and cost of installation of an apparatus can be reduced.

(3) Because of a structure utilizing sensible heat of high temperature exhaust gas discharged from a metallurgical furnace as it is, in deriving a carbon dioxide gas reforming reaction by the addition of a reducing agent, formation and deposition of carbon and non-combustible materials are not generated, and amount of heat of exhaust gas can be increased. Additionally, expansion of utilization of exhaust gas and carbon dioxide gas emission reduction can simultaneously be achieved.

(4) Because of using a nozzle having a concentric double pipe structure comprising an outer pipe for blowing diluted nitrogen and an inner pipe for blowing a reducing agent, temperature of a reducing agent can be adjusted, and additionally, it is beneficial to effectively prevent rapid combustion and danger of explosion due to ejection of diluted nitrogen.

(5) Because of a concentric double pipe apparatus using natural gas or the like produced inexpensively and in large amount, as a reducing agent for a reforming reaction, it is economical. In particular, in the case of using nonfossil resource type organic compounds such as bioethanol and biodiesel as a reducing agent, it can become to greatly contribute to carbon dioxide gas emission reduction.

EXAMPLE C

In steelworks, a large amount of high temperature exhaust gas of 1,000° C. or higher containing carbon dioxide gas is generated from a oxygen converter, a smelting reduction furnace and the like. Those exhaust gases contain combustible components such as carbon monoxide other than carbon dioxide gas, and are therefore utilized as an energy source for operating various equipments in steelworks.

By the way, it is known that various hydrocarbons such as methane and oxygen-containing compounds such as methanol and dimethyl ether react with carbon dioxide gas and are reformed into carbon monoxide and hydrogen. In this case, various hydrocarbons such as methane act as a reducing agent to carbon dioxide gas. This reaction is an endothermic reaction, and when methane and carbon dioxide gas induce the reforming reaction, amount of heat of $\Delta H_{298K}$=247 kJ is absorbed. Specifically, when the exhaust gas containing carbon dioxide gas contacts a reducing agent such as methane to induce the reforming reaction shown by the formula (1), temperature of the exhaust gas spontaneously drops:

$$CH_4+CO_2 \rightarrow 2CO+2H_2 \qquad (1).$$

Carbon monoxide and hydrogen formed in the reaction shown by the formula (1) are a combustible gas. In the case of considering the gas as an energy source, the exhaust gas increases its calorie by the reaction of the formula (1). In other words, high temperature exhaust gas is reformed into a fuel gas containing combustible components such as carbon monoxide and hydrogen, and a material obtained by cooling the gas can be utilized as an energy source. Therefore, the reforming reaction product becomes a useful fuel gas.

It is known that the reforming reaction shown by the formula (1) is liable to proceed with increasing a temperature, and is a reaction that the equilibrium conversion of carbon dioxide gas at 900° C. is about 95%, and the equilibrium conversion reaches nearly 100% at about 1,000° C. or higher.

On the other hand, when a reducing agent such as methane is added to a metallurgical furnace generation exhaust gas comprising high temperature combustible gas of 800° C. or higher and preferably 1,000° C. or higher containing carbon dioxide gas and further containing a combustible component such as carbon monoxide and hydrogen, for example, a converter gas, and the reducing agent and carbon dioxide gas in the exhaust gas induce the above endothermic reaction, the high temperature exhaust gas is rapidly cooled by itself by the endothermic reaction, without relying on a cooling equipment.

However, we clarified that when the completion temperature of the above reforming endothermic reaction is lower than 800° C., the problem occurs that formation of solid carbon is remarkable, resulting in incurring deposition of a solid product in the equipment. For this reason, the endothermic reaction is desirably completed when a gas temperature after the reaction is 800° C. or higher. In the case of intending to cool to low temperature lower than 800° C., the intention can be achieved by concurrently using a general cooling method such as a heat exchanger.

The term "completion of reforming endothermic reaction" used herein means that the reaction between a reducing agent added such as methane and carbon dioxide gas in an exhaust gas proceeds up to almost equilibrium in its atmosphere. Theoretically, infinite residence time is required to completely proceed to equilibrium, and almost equilibrium cannot strictly be defined. "Completion of reforming endothermic reaction" is when a hydrogen gas concentration is increased relative to a hydrogen gas concentration in an exhaust gas before reforming. An exhaust gas temperature is decreased by a reforming reaction. Therefore, it has physical meaning to complete the reforming reaction when a gas temperature after the reaction is 800° C. or higher.

On the other hand, hydrogen atom derived from a reducing agent added converts into hydrogen gas by a reforming reaction. Analysis of an exhaust gas composition is essential in a process of recovering an exhaust gas as an energy source. Monitoring completion of a reaction by a hydrogen gas concentration has chemical meaning and is important as operation control.

In decarbonization blowing, because hydrogen gas in an exhaust gas is originally small as about 1 vol %, hydrogen gas in a gas after reforming is increased from about 2 to 25 times as compared with the amount before reforming, and due to this, monitoring is easy. Therefore, in decarbonization blowing, "completion of reforming endothermic reaction" is preferably when hydrogen gas is increased 2 times or more that before reforming.

On the other hand, in dephosphorization blowing in which an exhaust gas flow rate is originally small and exhaust gas recovery rate is low, it is recently conducted to increase an exhaust gas amount by introducing waste plastics, thereby increasing recovery rate. A hydrogen gas concentration in an exhaust gas before reforming reaches from about 10 to 15 vol % due to hydrogen gas generated from auxiliary materials such as waste plastics. Furthermore, because LPG or the like is supplied as a cooling gas for prevention of fire damage of tuyere in a bottom blowing converter, a large amount of hydrogen gas is generated even by decomposition of LPG. In such a case that a large amount of hydrogen gas is generated, a hydrogen concentration in an exhaust gas after reforming is merely increase of from 1 to 5% as compared with the concentration before reforming. Therefore, in dephosphorization blowing and a bottom blowing converter, "completion of reforming endothermic reaction" is preferably when hydrogen gas is increased 1% or more of the concentration before reforming. Consequently, as analytical precision of a gas analyzer, precision of 0.5% or less is preferred, and precision of 0.1% or less is particularly preferred. Such a gas analyzer can exemplify a thermal conductivity continuous measuring analyzer and gas chromatograph.

The characteristic in the cooling method of Example C is that, for example, in the case of a converter exhaust gas, the gas contains dust comprising a fine powder of iron oxide (fine particle of 0.5 mm or less and exceeding 100 μm, and fume of 100 μm or less) called converter dust, as a main component. The iron oxide fine powder (a mixture containing at least one of $FeO$, $Fe_2O_3$, $Fe_3O_4$ or iron oxyhydroxide) functions as a reforming catalyst which induces an endothermic reaction (oxidation reaction of methane) of the above formula (1) at lower temperature. Due to the presence of the iron oxide fine powder, the endothermic reaction of the formula (1) proceeds even though the exhaust gas is lower than 1,000° C. and 800° C. or higher, and effective cooling of the exhaust gas is achieved. This makes possible that the high temperature exhaust gas itself can chemically effectively be cooled by the endothermic reaction of the formula (1), not by a mechanical method, without relying on a cooling apparatus such as a water-cooling jacket. Because the converter dust contacts high temperature reducing gas discharged from a oxygen converter, a part thereof is reduced with the progress of the endothermic reaction of the formula (1), and iron oxide is formed. However, there is no difference in the function as a reforming catalyst.

Example C is described below based on an example of applying to high temperature exhaust gas discharged from a oxygen converter.

High temperature exhaust gas discharged from a oxygen converter generally contains from about 10 to 20 vol % of $CO_2$ and from about 50 to 80 vol % of CO, a calorific value is from about 1,500 to 2,000 kcal/Nm$^3$, and a temperature at a throat part during operation is from about 1,200 to 1,800° C. In Example C, a necessary amount of a reducing agent such as methane or natural gas is added to the converter exhaust gas at any one place or two or more places of a top blowing lance portion or a radiation part of from a duct, that is, a lower hood, to a first dust collector entry side to derive an endothermic reaction between the reducing agent and carbon dioxide gas as shown in the formula (1) above, thereby cooling the exhaust gas itself discharged from the oxygen converter.

The addition amount of the reducing agent for deriving the endothermic reaction is determined depending on a molar ratio between $CO_2$ and $CH_4$ according to a converter generation exhaust gas amount (m$^3$/hr). For example, where the molar ratio between $CO_2$ and $CH_4$ is 1:1, when $CO_2$ concentration in the gas is 15 vol % in the converter generation exhaust gas amount of 79,000 m$^3$/hr, the addition amount of methane as a reducing agent is about 11,850 m$^3$/hr.

The addition of a reducing agent can decrease an exhaust gas of about 1,600° C. to about 1,000° C. at the primary dust collector entry side in, for example, the lower hood without providing a water-cooling jacket structure in the radiation part. The radiation part is formed to have a water-cooling structure, and a mechanically forced-cooling method may concurrently be used.

Figure 7:
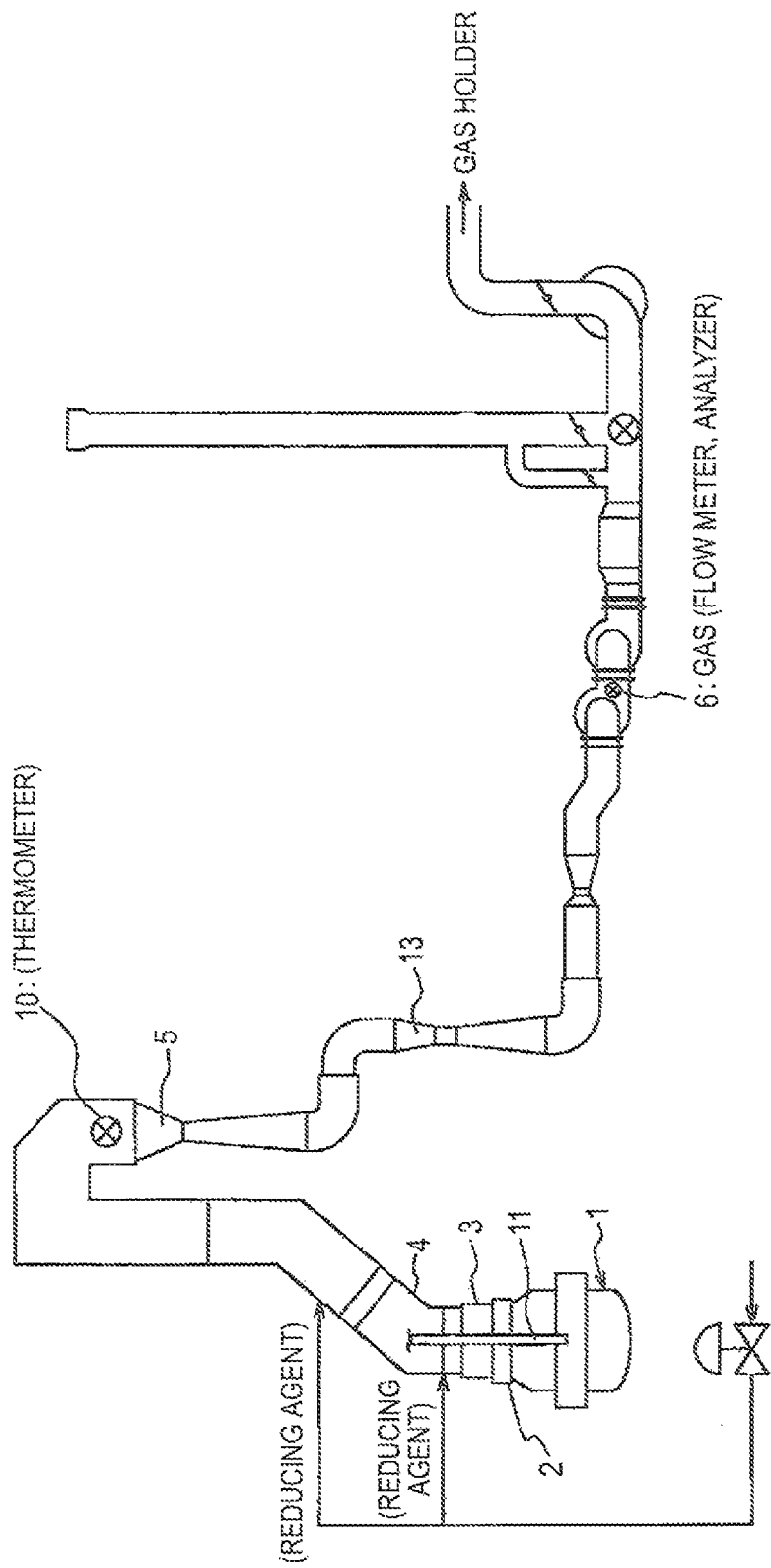
FIG. 7 is a schematic view of an oxygen converter exhaust gas cooling apparatus according to Example C.

FIG. 7 is a schematic line view of an oxygen converter gas recovery system of a oxygen converter for explaining a cooling method of a metallurgical furnace generation exhaust gas according to Example C. As shown in the drawing, a gas generated from a oxygen converter 1 is passed through a skirt 2, a lower hood 3 and a radiation part (duct) containing an upper hood 4, and discharged in a primary dust collector 5.

In Example C, the addition position of a reducing agent for deriving the endothermic reaction is that a reducing agent nozzle may be provided in any position of the lance 11, the lower hood 3, the upper hood 4 and the subsequent radiation part, as described before.

The reducing agent that can be used in Example B is preferably at least one selected from fossil resource compounds such as natural gas, liquefied petroleum gas, methane, ethane, light naphtha, raffinate, methanol, ethanol, dimethyl ether and diethyl ether. Above all, natural gas, liquefied petroleum gas, light naphtha, raffinate and diethyl ether are preferred in that those have good reactivity with carbon dioxide gas and are easily available inexpensively and in a large amount. In the case of a reducing agent that is a gas at room temperature, such as natural gas and liquefied petroleum gas, a nozzle suitable for gas blowing is used, and a nozzle shape and the number of a nozzle are not particularly limited. In the case of a reducing agent that is a liquid at room temperature, such as raffinate, the reducing agent may be injected by spraying the reducing agent in a mist state, and may be gasified and injected in a form of a gas. In the case of supplying in a mist state, its droplet diameter is such that contact with carbon dioxide gas is efficient, and is preferably from 0.01 to 1,000 µm, and more preferably from 0.1 to 100 µm. In the case of using liquefied gas such as dimethyl ether as a reducing agent, the reducing agent may previously be gasified and injected as a gas, and may be supplied by supplying in a form a liquid and gasifying the reducing agent near a nozzle or in a nozzle. In this case, in the case of gasifying near a nozzle or in a nozzle, the nozzle is cooled by heat of evaporation, and this is preferred in the point of protection of the nozzle.

The reducing agent may use nonfossil resource type organic compounds together with the fossil resource type compounds or in place of those. Use of the nonfossil resource type organic compounds is particularly preferred in that a reforming endothermic reaction is conducted by a carbon-neutral reducing agent, in addition to a portion that offgas is cooled and calorie-upgraded by the reforming endothermic reaction, and this can greatly contribute to emission reduction of carbon dioxide gas. Examples of the nonfossil resource type organic compound include bioethanol, biodiesel and a mixture of those. The bioethanol and biodiesel are a liquid at room temperature, and are used in the same manner as the raffinate described above. Liquefied gases of the nonfossile resource type organic compounds are used in the same manner as dimethyl ether described above.

EXAMPLE 2

This example is an example in which a test was conducted using a simulant test furnace comprising an alumina tube having an inner diameter of 12 mm and a length of 5 m. This test furnace is that a gas inlet is installed to an upstream flange of the aluminum tube and a methane gas introduction piping having an outer diameter of 3 mm, and a thermocouple protecting pipe are installed to the upstream flange, addition of methane gas is at a position of 1.5 m from the upstream flange, measurement control of a gas temperature is at a position of 1 m from the upstream flange, and the methane introduction pipe and the thermocouple protecting pipe are passed through the flange. A thermocouple insertion port and a gas cooling equipment by water cooling are installed to a downstream flange, and an integrating gas flow meter and a gas analyzer are installed to the downstream side of the gas cooling equipment. The entire alumina tube is covered with an electric furnace. Current was applied to only a 1 meter heater of the upstream side, and this part was made as a preheating zone of a converter simulant gas. Current was not applied to a downstream heater lower than the upstream heater, and the part was made as an adiabatic reaction zone.

Methane is injected at a downstream position of about 0.5 m of the preheating zone as described before. Therefore, the length of the actual adiabatic reaction zone is 3.5 m.

A mixed gas of CO: 50 vol %, $CO_2$: 15 vol %, $H_2$: 1 vol % and $N_2$: 34 vol % was prepared as a converter simulant gas. Simulant gas flow rate was set to 1 liter/min, methane gas flow rate was set to 150 ml/min which is equivalent to the flow rate of $CO_2$, and a reforming reaction test was conducted by changing a temperature of a preheating zone to 1,800° C., 1,500° C. and 1,300° C. As a result of measuring an outlet temperature of an adiabatic reaction zone by a thermocouple installed to the downstream flange in this example, the output temperatures were decreased to 1,060° C., 840° C. and 775° C. in each test of the preheating zone temperatures of 1,800° C., 1,500° C. and 1,300° C., respectively. Hydrogen gas concentrations at the outlet were 21 vol %, 20 vol % and 19 vol %, respectively. The gas residence time in the adiabatic zone was from 2 to 6 seconds.

Formation of carbon was not visually observed in the test that the temperature of a calorie-upgraded simulant gas is 1,060° C. (the case that the preheating zone temperature is 1,800° C.) and the test that the temperature of a calorie-upgraded simulant gas is 840° C. (the case that the preheating zone temperature is 1,500° C.). However, formation of carbon was remarkable in the test that the calorie-upgraded simulant gas temperature is lower than 800° C. (the case that the preheating zone temperature is 1,300° C.).

EXAMPLE 3

Figure 8:
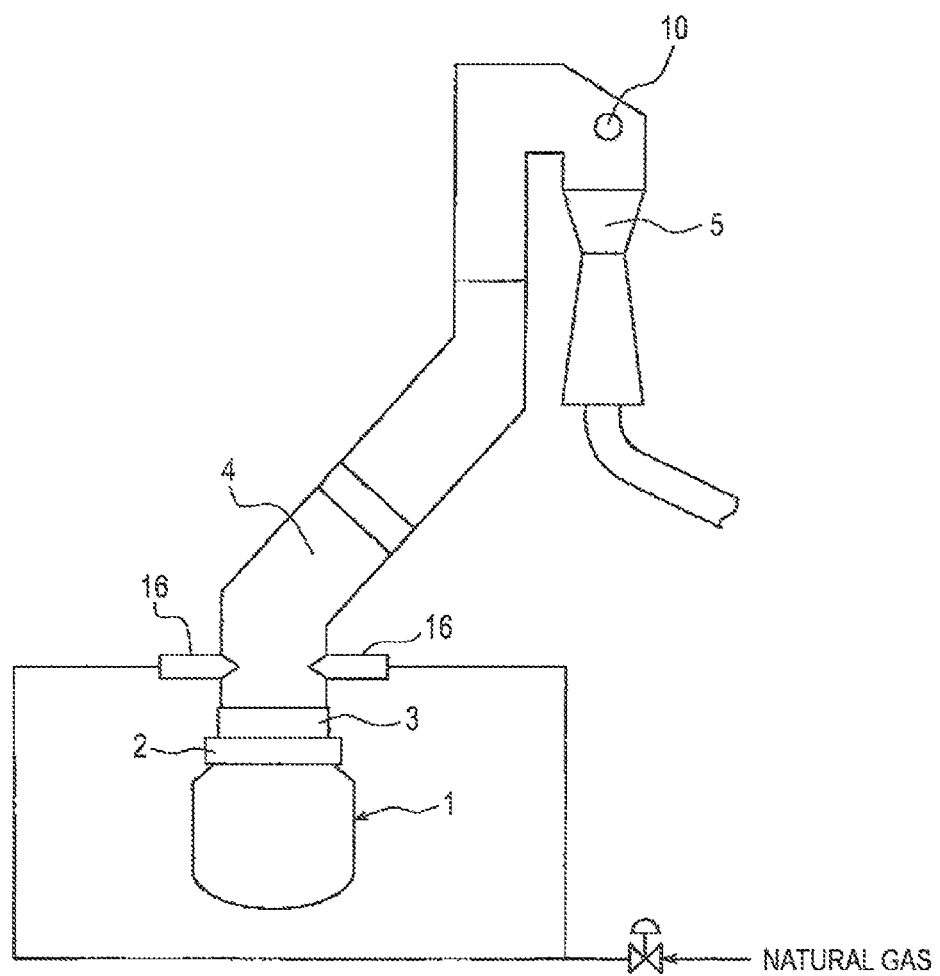
FIG. 8 is a schematic view of an oxygen converter exhaust gas cooling apparatus equipped with a reducing agent blowing equipment according to Example C.

This example is an example in which a test was conducted that a 300 t top blowing converter is used and a reducing agent blowing port 16 for adding natural gas to a converter exhaust gas (offgas) containing a converter dust (iron oxide fine powder) from the lower end of the upper hood 4 is provided to cool a radiation part that is an exhaust passage (duct), as shown in FIG. 8. In the general operation, the converter is that the lower hood 3 and the upper hood 4 that are exhaust passages have a cooling pipe structure, and offgas is cooled by water cooling. The test was conducted by stopping the water cooling. The offgas when natural gas is not blown therein has a flow rate of 79,000 $Nm^3/h$, and a gas composition of CO: 50 vol %, $CO_2$: 15 vol %, $H_2$: 1 vol % and $N_2$: 34 vol %. The natural gas added was 11,850 $Nm^3/h$ which is equivalent to the $CO_2$ flow rate. Because $CH_4$ content of the natural gas was 92 vol %, a molar ratio of $CO_2$ and $CH_4$ can be approximated by 1:1. The offgas temperature near the converter throat was about 1,700° C.

An offgas flow meter and the gas analyzer 6 were installed to the downstream side of a secondary dust collector (dust catcher), and the thermometer 10 was installed to the upstream side of the primary dust collector (wet duct collector). Thereafter, addition of natural gas was initiated, and a temperature, a flow rate and a composition of the reformed offgas were monitored. As a result, the offgas had a temperature of 980° C., a flow rate of 114,400 $Nm^3/h$, and a composition of CO: 55 vol %, $CO_2$: 0.1 vol %, $H_2$: 21 vol %, $N_2$: 23.5 vol %, $CH_4$: 0.1 vol % and $O_2$: less than 0.1 vol %. By installing the natural gas blowing port, the offgas could be cooled in an exhaust passage without any problem. By the reaction, hydrogen gas was increased 21 times, and a reforming endothermic reaction was completed at 980° C.

EXAMPLE 4

Figure 9:
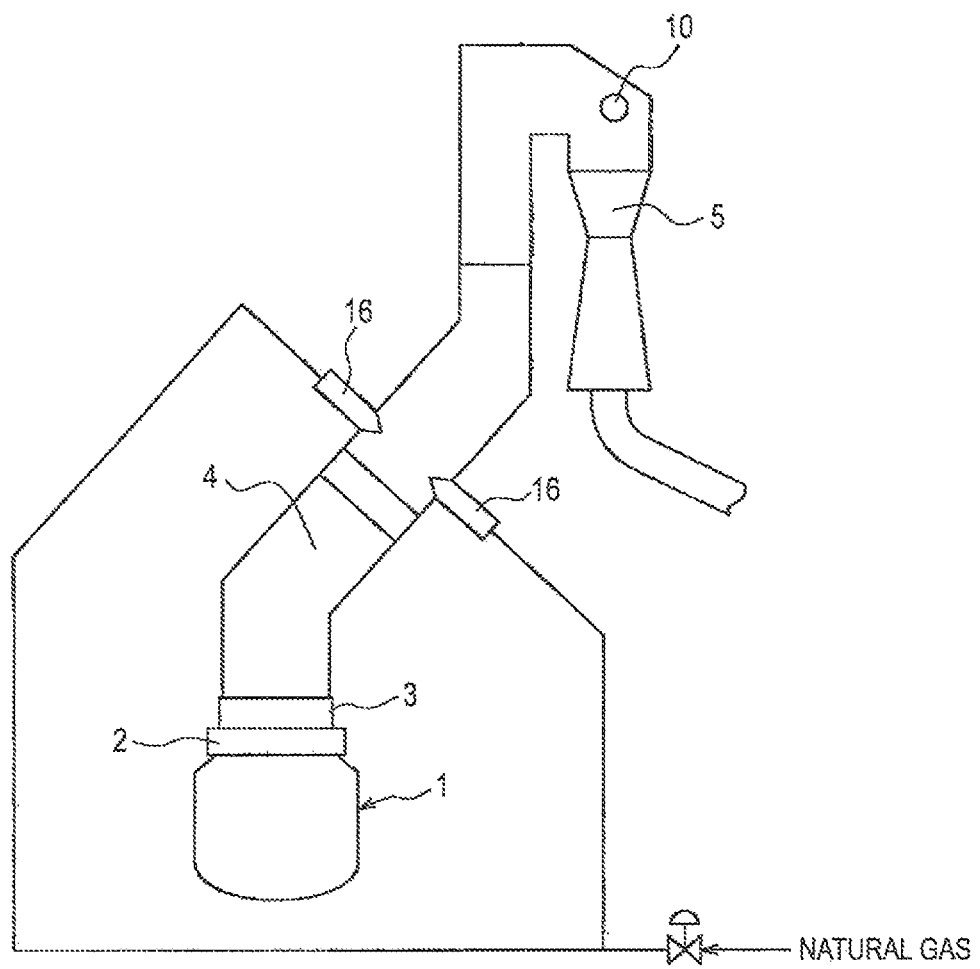
FIG. 9 is other schematic view of an oxygen converter exhaust gas cooling apparatus equipped with a reducing agent blowing equipment according to Example C.

A test was conducted in the same manner as in Example 3, except that a blowing port was installed to the lower end of a first radiation part at the upper part of the upper hood 4 as shown in FIG. 9. The offgas temperature at the blowing port was about 1,300° C.

Similar to Example 1, addition of natural gas was initiated, and a temperature, a flow rate and a composition of the reformed offgas were monitored. As a result, the offgas had a temperature of 940° C., a flow rate of 77,280 $Nm^3/h$, and a composition of CO: 63 vol %, $CO_2$: 7 vol %, $H_2$: 8 vol %, $N_2$: 21 vol %, $CH_4$: less than 0.1 vol % and $O_2$: less than 0.1 vol %. The offgas could be cooled in an exhaust passage without any problem. By the reaction, hydrogen gas was increased 8 times, and a reforming endothermic reaction was completed at 940° C.

EXAMPLE 5

Preparation of Dust Particle

Water was blown to an exhaust gas discharged from a 300 t top blowing converter over two stages of a primary dust collector 5 and a second dust collector 13, and converter dust was collected. Coarse particle dust exceeding 100 μm was separated from waste water containing the collected converter dust using a coarse particle separator. A coagulating agent was added to the remaining waste water, and fine particles were aggregation-precipitated and concentrated. Thereafter, the concentrate was dehydrated by filter press to obtain fine powder dust.

The thus-obtained coarse particle dust and fine particle dust were dried at 105° C. overnight and crushed to 0.5 mm or less using a mortar and a pestle, respectively. Those particles were again dried at 105° C. for 2 hours, and then applied to an activity evaluation test.

Activity Evaluation Test and Result

This test is an example conducted using a quartz simulant test furnace having an inner diameter of 7 cm and a length of 200 cm. A mixed gas of CO: 60 vol %, $CO_2$: 15 vol %, $H_2$: 1 vol % and $N_2$: 24 vol % was used as a converter simulant gas. Simulant gas flow rate was fixed to a flow rate of 850 ml/min, and methane gas was fixed to a flow rate of 127.5 ml/min which is equivalent to the flow rate of $CO_2$. The simulant gas was introduced into a test furnace having 19 ml of dust charged therein. Preheating was conducted by an electric furnace, thereby changing the simulant gas temperature at the time of the reforming reaction to 700° C., 800° C., 900° C. and 1,000° C. Gas composition at the respective outlets was analyzed, and an apparent rate constant K' was calculated from the gas composition obtained, and contact time between gas and dust.

Figure 10:
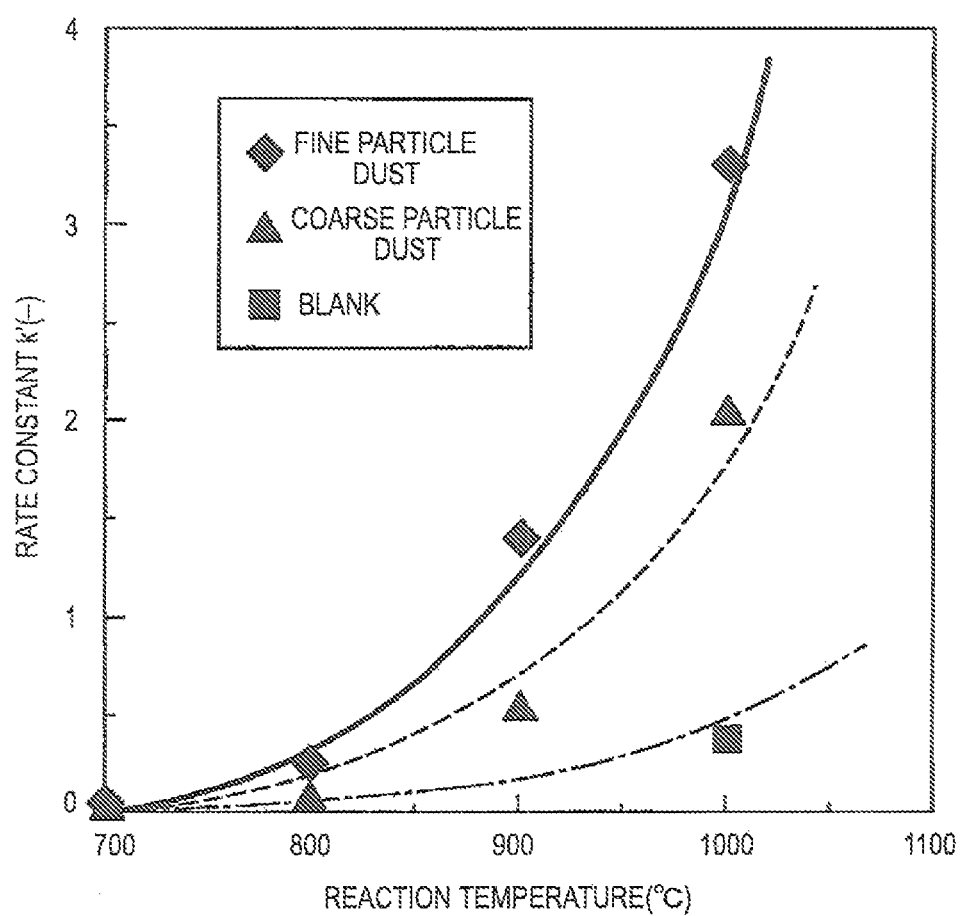
FIG. 10 is a graph showing the relationship between a reaction temperature and a rate constant, of an oxygen converter duct according to Example C.

Evaluation results including a blank test in which dust is not added are shown in FIG. 10. It was confirmed from this result that dust functions as a catalyst and has excellent reforming reaction activity.

What is claimed is:

1. A method of reforming a metallurgical furnace exhaust gas generated from a metallurgical furnace which is an oxygen converter comprising:
    adding a reducing agent to the metallurgical furnace exhaust gas which contains high temperature carbon dioxide gas between a skirt device and a primary dust collector in an oxygen converter gas recovery system of the oxygen converter and reacting the carbon dioxide gas and the reducing agent to reform the exhaust gas, wherein
    the reducing agent is added when an oxygen concentration in the exhaust gas is 1 vol % or less, and
    a reforming reaction is completed when an exhaust gas temperature is 800° C. or more.

2. The method according to claim 1, wherein
    the reducing agent is at least one fossil resource type compound selected from the group consisting of liquefied petroleum gas, ethane, light naphtha, raffinate, methanol, ethanol, dimethyl ether and diethyl ether.

3. The method according to claim 1, wherein
    the reducing agent is at least one nonfossil resource type compound selected from the group consisting of bioethanol, biodiesel and a mixture of bioethanol and biodiesel.

4. The method according to claim 1, wherein
    the high temperature exhaust gas discharged from the metallurgical furnace has a temperature of from 800 to 1,800° C.

5. The method according to claim 4, wherein
    the high temperature exhaust gas discharged from the metallurgical furnace has a temperature of from 1,000 to 1,800° C.

6. The method according to claim 1, wherein
    the high temperature exhaust gas discharged from the metallurgical furnace has a $CO_2$ concentration of from 3 to 30 vol %.

7. The method according to claim 1, wherein the reducing agent is added when an oxygen concentration in the exhaust gas is 0.5 vol % or less.

8. The method according to claim 1, wherein
    the reforming reaction is completed when the exhaust gas temperature is from 800 to 1,100° C.

9. The method according to claim 8, wherein
    the reforming reaction is completed when the exhaust gas temperature is from 850 to 1,050° C.

10. The method according to claim 1, wherein
    the reforming reaction is conducted at the exhaust gas temperature of 800° C. or more for a residence time of from 0.01 to 50 seconds.

11. The method according to claim 10, wherein
    the reforming reaction is conducted at the exhaust gas temperature of 800° C. or more for a residence time of from 0.1 to 20 seconds.

12. The method according to claim 1, wherein
    the metallurgical furnace is an oxygen converter, and
    the reducing agent is added from a side pipe of a top blowing lance of the oxygen converter.

13. A method of producing a reformed metallurgical furnace exhaust gas comprising:
    adding a reducing agent to the metallurgical furnace exhaust gas which contains high temperature carbon dioxide gas to react the carbon dioxide gas and the reducing agent,
    wherein the reducing agent is added when an oxygen concentration in the exhaust gas is 1 vol % or less, and
    a reforming reaction is completed when an exhaust gas temperature is 800° C. or more.

14. The method according to claim 13, wherein
    the reducing agent is at least one fossil resource type compound selected from the group consisting of liquefied petroleum gas, ethane, light naphtha, raffinate, methanol, ethanol, dimethyl ether and diethyl ether.

15. The method according to claim 13, wherein
    the reducing agent is at least one nonfossil resource type compound selected from the group consisting of bioethanol, biodiesel and a mixture of bioethanol and biodiesel.

\* \* \* \* \*

UNITED STATES PATENT AND TRADEMARK OFFICE
CERTIFICATE OF CORRECTION

| | | |
|---|---|---|
| PATENT NO. | : 8,765,087 B2 | Page 1 of 1 |
| APPLICATION NO. | : 12/990375 | |
| DATED | : July 1, 2014 | |
| INVENTOR(S) | : Takagi et al. | |

It is certified that error appears in the above-identified patent and that said Letters Patent is hereby corrected as shown below:

In the Specification

Column 9

Line 41, change "(800° C.)" to -- ($\geq$ 800° C.) --

Signed and Sealed this
Twenty-fourth Day of February, 2015

Michelle K. Lee
*Deputy Director of the United States Patent and Trademark Office*